US011311803B2

(12) United States Patent
Kawano et al.

(10) Patent No.: US 11,311,803 B2
(45) Date of Patent: Apr. 26, 2022

(54) INFORMATION PROCESSING DEVICE, INFORMATION PROCESSING METHOD, AND PROGRAM

(71) Applicant: SONY CORPORATION, Tokyo (JP)

(72) Inventors: Shinichi Kawano, Tokyo (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 129 days.

(21) Appl. No.: 16/471,882

(22) PCT Filed: Jan. 4, 2018

(86) PCT No.: PCT/JP2018/000016
§ 371 (c)(1),
(2) Date: Jun. 20, 2019

(87) PCT Pub. No.: WO2018/135304
PCT Pub. Date: Jul. 26, 2018

(65) Prior Publication Data
US 2020/0122033 A1 Apr. 23, 2020

(30) Foreign Application Priority Data
Jan. 18, 2017 (JP) ............................ JP2017-006897

(51) Int. Cl.
*A63F 13/215* (2014.01)
*A63F 13/537* (2014.01)
(Continued)

(52) U.S. Cl.
CPC .......... *A63F 13/424* (2014.09); *A63F 13/215* (2014.09); *A63F 13/537* (2014.09);
(Continued)

(58) Field of Classification Search
CPC .... A63F 13/424; A63F 13/215; A63F 13/537; A63F 2300/1081; A63F 2300/572
See application file for complete search history.

(56) References Cited

U.S. PATENT DOCUMENTS

2006/0025216 A1* 2/2006 Smith ..................... A63F 13/87 463/35
2009/0240359 A1* 9/2009 Hyndman ........... H04L 65/4015 700/94
(Continued)

FOREIGN PATENT DOCUMENTS

JP H09-023275 A 1/1997
JP 2005-322125 A 11/2005
(Continued)

*Primary Examiner* — Peter S Vasat
*Assistant Examiner* — Thomas H Henry
(74) *Attorney, Agent, or Firm* — Paratus Law Group, PLLC

(57) ABSTRACT

There is provided an information processing device, an information processing method, and a program that make it possible to control a communication partner without losing a sense of immersion and without impairing a VR world view in communication between players in (virtual reality) VR. A range in which another player capable of recognizing a content spoken by a player is present is determined as an utterance range on the basis of context information. In the following, since the spoken information is transmitted only to the player who is confirmed as the utterance range, it is possible to control the partner at the time of utterance by the context information. The present disclosure is able to be applied to an information processing device.

20 Claims, 22 Drawing Sheets

(51) Int. Cl.
*A63F 13/424* (2014.01)
*H04S 7/00* (2006.01)

(52) U.S. Cl.
CPC ...... *H04S 7/303* (2013.01); *A63F 2300/1081* (2013.01); *A63F 2300/572* (2013.01)

(56) References Cited

U.S. PATENT DOCUMENTS

| | | | | |
|---|---|---|---|---|
| 2013/0022222 | A1* | 1/2013 | Zschau | G03H 3/00<br>381/306 |
| 2016/0315895 | A1* | 10/2016 | Alkov | A63F 13/12 |

FOREIGN PATENT DOCUMENTS

| | | | |
|---|---|---|---|
| JP | 2010-262523 | A | 11/2010 |
| JP | 2011-518366 | A | 6/2011 |
| JP | 2016-187063 | A | 10/2016 |
| WO | WO 2016/002445 | A1 | 1/2016 |

* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2018/000016 (filed on Jan. 4, 2018) under 35 U.S.C. § 371, which claims priority to Japanese Patent Application No. 2017-006897 (filed on Jan. 18, 2017), which are all hereby incorporated by reference in their entirety.

TECHNICAL FIELD

The present disclosure relates to an information processing device, an information processing method, and a program, and more particularly, to an information processing device, an information processing method, and a program capable of controlling a communication partner without losing a sense of immersion and without impairing a VR world view in communication between players in a virtual reality space (virtual reality: VR).

BACKGROUND ART

Based on position information of a sound source and a player in the virtual reality space (hereinafter referred to as virtual reality (VR)), a method of delivering a voice to a communication partner while maintaining realism (maintaining a VR world view) has been proposed (refer to Patent Literature 1).

CITATION LIST

Patent Literature

Patent Literature 1: JP 2016-187063A

DISCLOSURE OF INVENTION

Technical Problem

However, the technology according to Patent Literature 1 described above is based on the position information, the voice is uniformly transmitted to the partner in the same range, and thus it is impossible to control switching between transmitting the voice to a specific partner and transmitting the voice to all members. Therefore, it is only possible to uniformly control either one.

Therefore, a user speaks without knowing to which partner the voice is transmitted, and the user has anxiety about to whom utterance content is transmitted.

In addition, by producing a user interface (UI) or the like, it is possible to control switching between transmitting the voice to only a specific partner and transmitting the voice to all members, but in a case of a general UI operation, influence occurs in an operation such as a game that is an original purpose, and there is a concern that the world view of the VR is greatly impaired.

Furthermore, in communication between players in VR, it has been impossible to control a communication partner without losing a sense of immersion and without impairing a VR world view. That is, in the communication between the players in the VR, since it is difficult to understand a destination or a sender and it is not possible to distinguish between a direct message and a public message, it is necessary to speak in a state in which one does not know with whom one is communicating, and there has been concern that communication itself in such a situation causes distress.

The present disclosure has been made in view of such circumstances, and in particular, is capable of controlling a communication partner without losing a sense of immersion and without impairing a VR world view in communication between players in VR.

Solution to Problem

An information processing device of one aspect of the present disclosure is an information processing device including: an utterance range determination unit that determines a range in which another player capable of recognizing spoken content is present as an utterance range when a player speaks on the basis of context information.

The utterance range can be a range in which another player capable of recognizing information based on voice data spoken by the player is present.

The context information can include voice data, behavior information, attitude information, line of sight information, and peripheral context information of the player.

A voice data acquisition unit that acquires an utterance of the player as the voice data from the context information can be further included. The utterance range determination unit can determine the utterance range on the basis of the voice data.

The utterance range determination unit can determine the utterance range on the basis of a pitch of the voice data.

The utterance range determination unit can determine the utterance range on the basis of a speech speed of the voice data.

A behavior information attitude information acquisition unit that acquires the behavior information and the attitude information of the context information can be further included. The utterance range determination unit can determine the utterance range on the basis of the behavior information and the attitude information.

A line of sight information acquisition unit that acquires the line of sight information of the context information can be further included. The utterance range determination unit can determine the utterance range on the basis of the line of sight information.

A peripheral context information acquisition unit that acquires the peripheral context information of the context information can be further included. The utterance range determination unit can determine the utterance range on the basis of the peripheral context information.

The peripheral context information can include virtual reality (VR) context information.

A line of sight information acquisition unit that acquires the line of sight information of the context information; and a display unit that displays a VR space on the basis of the VR context information can be further included. When a line of sight of the player stagnates at a position where a predetermined player is present in the VR space for a predetermined time on the basis of the line of sight information, the display unit can display a line of sight stagnation mark representing a time when the line of sight stagnates on a position where the predetermined player is displayed.

When the line of sight of the player stagnates at a position where another player is present in the VR space, which is displayed by the display unit, for a time longer than a predetermined time on the basis of the line of sight information, the utterance range determination unit can determine the other player as the utterance range, and the display unit can display a mark indicating the determination of the utterance range by the line of sight on a position where the other player is displayed.

When the utterance range determination unit determines the player within the utterance range by a line of sight of the other player on the basis of the line of sight information of the other player in the VR space, the display unit can display a reception line of sight stagnation mark on a position where the other player is displayed.

In a case in which it is able to be confirmed that the reception line of sight stagnation mark is visually recognized on the basis of the line of sight information of the player in the VR space, the utterance range determination unit can determine the other player as the utterance range, and the display unit can display a mark representing that eye contact is established on a position where the other player is displayed.

A display unit that displays a VR space on the basis of the VR context information; a voice data acquisition unit that acquires an utterance of the player as the voice data from the context information; and a transmission control unit that controls to which player included in the utterance range transmission is to be performed on the basis of the voice data acquired by the voice data acquisition unit can be further included. The transmission control unit can display a voice recognition result of the voice data as text on the display unit, and in a case in which a plurality of the players is present in the utterance range, the transmission control unit can sequentially move and display the text to each of the plurality of players in order.

The transmission control unit can display, on the display unit, text that is able to be visually recognized by a player within the utterance range and that is not able to be visually recognized by a player outside the utterance range.

The utterance range can be presented to the player by any one of an image, a warning sound, a warning vibration, and a warning synthetic sound, or a combination of the image, the warning sound, the warning vibration, and the warning synthetic sound.

An information processing method of one aspect of the present disclosure is an information processing method including: a step of determining a range in which another player capable of recognizing spoken content is present as an utterance range when a player speaks on the basis of context information.

A program of one aspect of the present disclosure is a program that causes a computer to function as: an utterance range determination unit that determines a range in which another player capable of recognizing spoken content is present as an utterance range when a player speaks on the basis of context information.

According to one aspect of the present disclosure, when a player speaks, a range in which another player capable of recognizing the spoken content is present is determined as an utterance range on the basis of context information.

Advantageous Effects of Invention

According to one aspect of the present disclosure, in particular, it is possible to control a communication partner without losing a sense of immersion and without impairing a VR world view in communication between players in (virtual reality) VR.

MODE(S) FOR CARRYING OUT THE INVENTION

Figure 1:
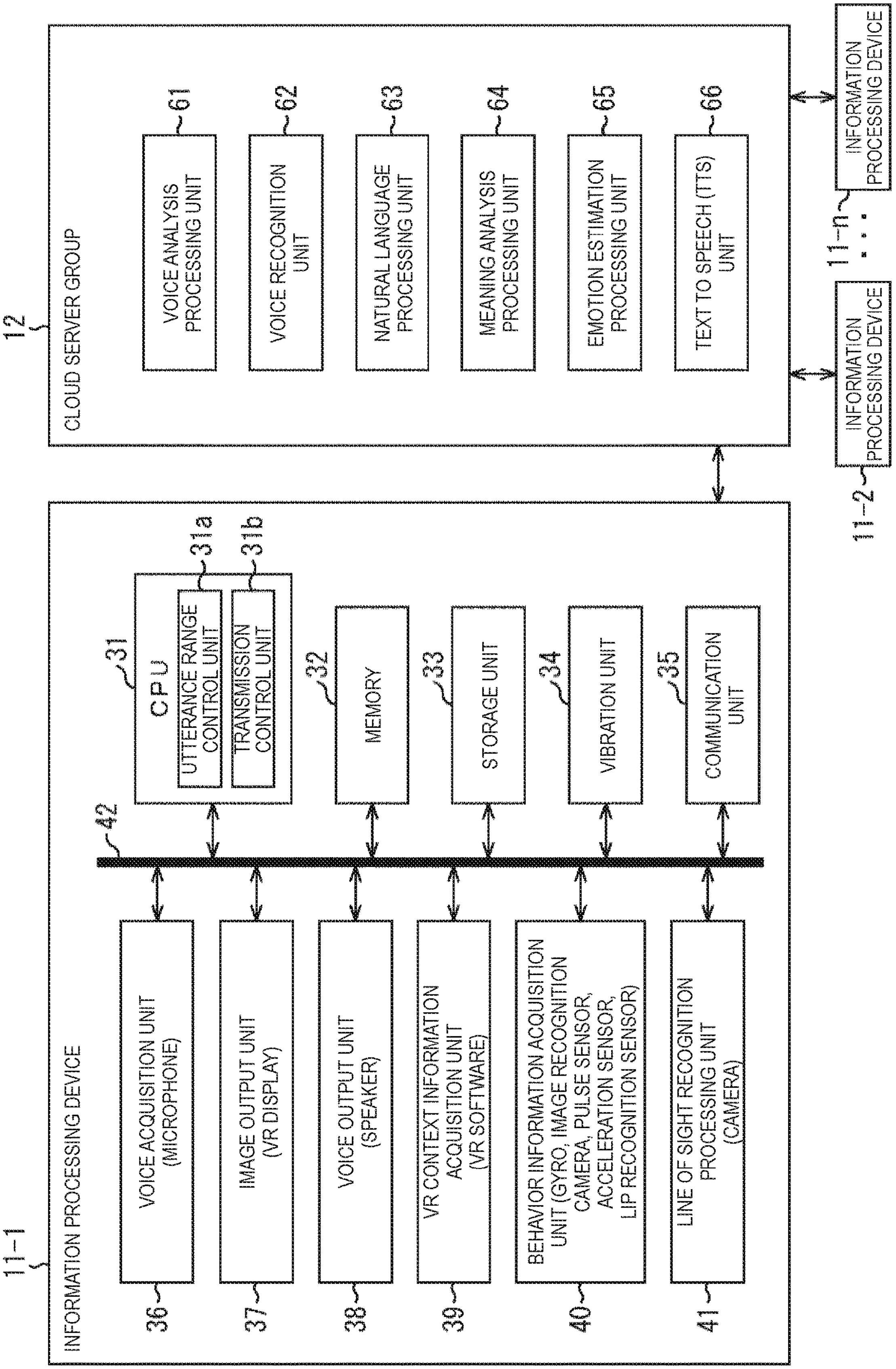
FIG. 1 is a block diagram showing a configuration example of an information processing system of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

<Configuration Example of Information Processing System>

A configuration example of an information processing system including an information processing device and a cloud server group to which a technique of the present disclosure is applied will be described.

The information processing system of FIG. 1 includes information processing devices 11-1 to 11-*n* such as head mounted displays mounted on users who are players of a game or the like realized by a virtual reality space (hereinafter, also referred to as virtual reality (VR)) for example, and a cloud server group 12 that realizes generation and control of various pieces of information presented to the information processing devices 11-1 to 11-*n*. In addition, each of the information processing devices 11-1 to 11-*n* is simply referred to as an information processing device 11 unless it is particularly necessary to distinguish between the information processing devices 11-1 to 11-*n*.

The information processing device 11 detects a situation, a positional relationship, a behavior, an attitude, a line of sight, and a voice at the time of utterance in the VR as context information of the user, and determines a player in the VR to be a partner to whom the utterance of the user is to be transmitted as an utterance range on the basis of the context information that is a detection result. The information processing device 11 presents the utterance range to a user who wears the information processing device 11 in a form that is able to be recognized by the user, for example, by displaying the utterance range on a display or the like. This presentation makes it possible for the user to speak while recognizing his or her own utterance range and is relieved from the distress of communicating in VR without knowing to which partner his or her own utterances are communicated.

In addition, the information processing device 11 narrows down the players within the utterance range according to the utterance content, notifies other information processing devices 11 used by the players who are the partners to whom the utterance content is transmitted according to the utterance content, and presents the utterance content to the users using the other information processing devices 11. At this time, the information processing device 11 presents various pieces of information through visual, auditory, and tactile sensations of the user.

Furthermore, in presenting the various pieces of information to the user through visual, auditory, and tactile sensations, the information processing device 11 transmits voice data of the context information to the cloud server group 12 including a plurality of server computers and the like as occasion demands, causes the cloud server group 12 to analyze the voice data, and uses an analysis result.

The cloud server group 12 analyzes the voice data of the context information and transmits the analysis result to the information processing device 11.

The information processing device 11 acquires information specifying the partner to whom the player who is the user wearing the information processing device 11 wishes to transmit information transmitted from the cloud server group 12, within the VR, and notifies of (presents) the utterance range that is a range of the utterance of the user who wears the information processing device 11 in the VR and the player who is the partner in the utterance range to the user on the basis of the information of the specified partner.

With this configuration, the user who controls the player of the game or the like which is realized by the VR is able to speak while switching communication partners, that is, the partners to whom the player wishes to transmit information (while controlling the switching of the partners), without losing a sense of immersion and without impairing a VR world view in the VR, in a space that is realized by the VR.

Hereinafter, more specifically, a configuration example of the information processing device 11 and the cloud server group 12 included in the information processing system of FIG. 1 will be described.

In addition, hereinafter, the description will be given using a game realized in the VR as an example, a character in the game will be referred to as a player, and the user wearing the information processing device 11 participates in the game realized in the VR by controlling each of the players appearing in the game.

The information processing device 11 includes a central processing unit (CPU) 31, a memory 32, a storage unit 33, a vibration unit 34, a communication unit 35, a voice acquisition unit 36, an image output unit 37, a voice output unit 38, a VR context information acquisition unit 39, a behavior information acquisition unit 40, and a line of sight recognition processing unit 41.

The CPU 31 controls the overall operation of the information processing device 11 by controlling various connected configurations through a bus 42. In addition, the CPU 31 reads a program stored in the storage unit 33 including a hard disk drive (HDD) or a solid state drive (SSD) and the like, develops the program in the memory 32 including a semiconductor memory or the like, executes the program, and realizes a predetermined function. More specifically, the CPU 31 functions as an utterance range control unit 31*a* and a transmission control unit 31*b* by executing the program stored in the storage unit 33.

The utterance range control unit 31*a* determines an utterance range of the player controlled by the user on the basis of the context information acquired by the voice acquisition unit 36, the VR context information acquisition unit 39, the behavior information acquisition unit 40, and the line of sight recognition processing unit 41. More specifically, when the player controlled by the user speaks in the VR, the utterance range control unit 31*a* determines a range in which another player who is able to recognize the spoken content is present or another player who is able to recognize the spoken content.

Here, the context information is information representing a state of the player. More specifically, the context information is, for example, voice data acquired by the voice acquisition unit 36, VR context information acquired by the VR context information acquisition unit 39, behavior information and attitude information acquired by the behavior information acquisition unit 40, and line of sight information acquired by the line of sight recognition processing unit 41. In addition, the VR context information includes the player or an object controlled by the user in the VR, and a position or a situation of a player or object in the vicinity of the player or the object controlled by the user.

The context information associated with the voice data is, for example, pitch, volume, frequency, language, and the like of a voice, and further includes emotions or the like obtained on the basis of the voice data.

The context information associated with the behavior information is information for identifying a behavior of the player such as stopping, walking, and running.

The context information associated with the attitude information is, for example, information for identifying an attitude of the player such as orientation, sitting, and standing.

The context information associated with the line of sight information is, for example, information associated with a line of sight of the player such as a line of sight direction and a gaze state.

Furthermore, in addition to the above, the context information includes a situation of the player, and includes, for example, the situation of the player such as crying, laughing, indifference, sadness, and happiness.

In a state in which the utterance range is specified, the transmission control unit 31*b* furthermore narrows down objects to which the information is to be transmitted in the utterance range on the basis of the voice data when the user speaks, and further controls the information to be transmitted and a transmission method.

The vibration unit 34 switches and vibrates a plurality of parts of a body of the information processing device 11 including a head mount display and the like to give a stimulus by the vibration to various parts of a head of the user who wears the information processing device 11.

The communication unit 35 realizes communication of, for example, a local area network (LAN) by wireless communication of a predetermined frequency band or wired communication, and executes transmission and reception of predetermined data or a program through the Internet or the like.

The voice acquisition unit 36 includes, for example, a microphone, acquires a voice generated by the user wearing the information processing device 11, and outputs the voice as the voice data to the CPU 31 through the bus 42.

The image output unit 37 includes, for example, a liquid crystal display (LCD) or an organic electroluminescence (EL), and when the information processing device 11 functions as a head mounted display as a whole, the image output unit 37 functions as a VR display that displays an image in the VR to the user.

The voice output unit 38 includes, for example, a speaker or a headphone, and outputs voice in the VR to the user.

The VR context information acquisition unit 39 acquires the VR context information including positions or situations of various objects or players in the VR (including a position or a situation of another player), and supplies the VR context information to the CPU 31 through the bus 42.

The behavior information acquisition unit 40 acquires the behavior information or the attitude information of the user who controls a motion of the player in the VR, and supplies the behavior information or the attitude information of the user to the CPU 31. More specifically, the behavior information acquisition unit 40 includes, for example, a gyro sensor, an image recognition camera, a pulse sensor, an acceleration sensor, and a lip recognition sensor.

The line of sight recognition processing unit 41 recognizes the line of sight direction from, for example, an image of eyes captured by a camera that captures the eyes of the user who controls the motion of the player in the VR.

The cloud server group 12 includes a plurality of server computer groups that are present on a network including the Internet or the like (not shown), and functions as a voice analysis processing unit 61, a voice recognition unit 62, a natural language processing unit 63, a meaning analysis processing unit 64, an emotion estimation processing unit 65, and a text to speech (TTS) unit 66. Various functions of the cloud server group 12 may be realized by a single server computer or may be realized by a plurality of server computers.

The voice analysis processing unit 61 performs noise removal or emphasis on voice of a predetermined frequency on the voice data supplied from the information processing device 11 and analyzes various pieces of the voice data. For example, the voice analysis processing unit 61 analyzes a type of language (a type such as Japanese, English, or French) based on the voice data, a pitch of the spoken voice expressed as a rate of occurrence of each fundamental frequency, a speech speed expressed as the number of phonemes per unit time, volume, and presence or absence of intonation. In addition, the voice analysis processing unit 61 supplies the voice data from which noise is removed to the voice recognition unit 62.

The voice recognition unit 62 recognizes the voice data as words (for example, text data) produced from the voice data supplied from the voice analysis processing unit 61, and supplies a recognition result together with the voice data to the natural language processing unit 63.

The natural language processing unit 63 carries out a natural language process on the recognition result on the basis of the voice data and the recognition result supplied from the voice recognition unit 62, and outputs a process result including, for example, the text data to the meaning analysis processing unit 64.

The meaning analysis processing unit 64 analyzes the meaning on the basis of a process result including, for example, the text data, on which the natural language process is carried out, and outputs an analysis result to the emotion estimation processing unit 65.

The emotion estimation processing unit 65 estimates the emotion of the user who controls the player who produced the voice including the voice data on the basis of the voice analysis result and the meaning analysis result. In addition, regarding a specific method of emotion estimation based on the voice data, for example, refer to "Application of voice cranial nerve analysis technique, technique for quantitatively measuring mind (http://agi-web.co.jp/docs/Univ-Tokyo.pdf)".

The text to speech (TTS) unit 66 generates synthetic voice by TTS on the basis of the text data that is converted into natural language which is a natural language process result.

<Regarding Display Example of Image Output Unit>

Next, a display example of the image output unit will be described with reference to FIG. 2.

Figure 2:
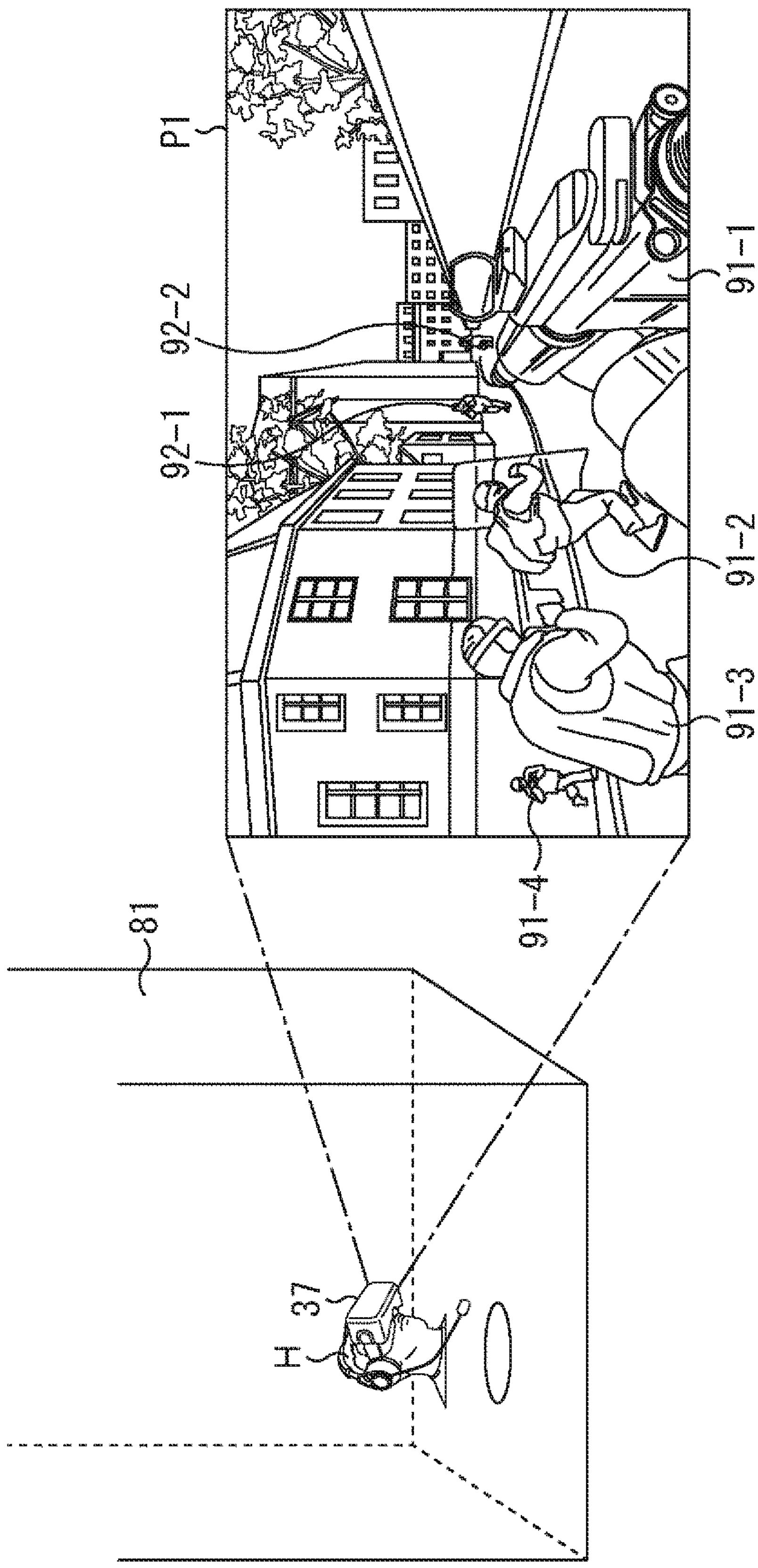
FIG. 2 is a diagram for explaining a display example of an image output unit of FIG. 1.

For example, the image output unit 37 is a so-called head mounted display that is worn on the head of the user H as shown in a left portion of FIG. 2 and displays an image that is able to be viewed by the user H by visual observation.

In the image output unit 37, for example, an image P1 as shown in the right portion of FIG. 2 is displayed. The image P1 shown in the right portion of FIG. 2 is an example of an image of a battle scene in a game, a gun held by a player controlled by the user H and the player 91-1 operated by the user H by a hand holding the gun are displayed, and players 91-2 to 91-4 who are comrades and players 92-1 and 92-2 who are enemies are displayed, respectively. In the image output unit 37 of the information processing devices 11 worn by the respective users controlling each of the players 91-2 to 91-4, 92-1, and 92-2, images corresponding to positional relationships in the VR of the respective players are displayed.

<Feedback Display Column>

Figure 3:
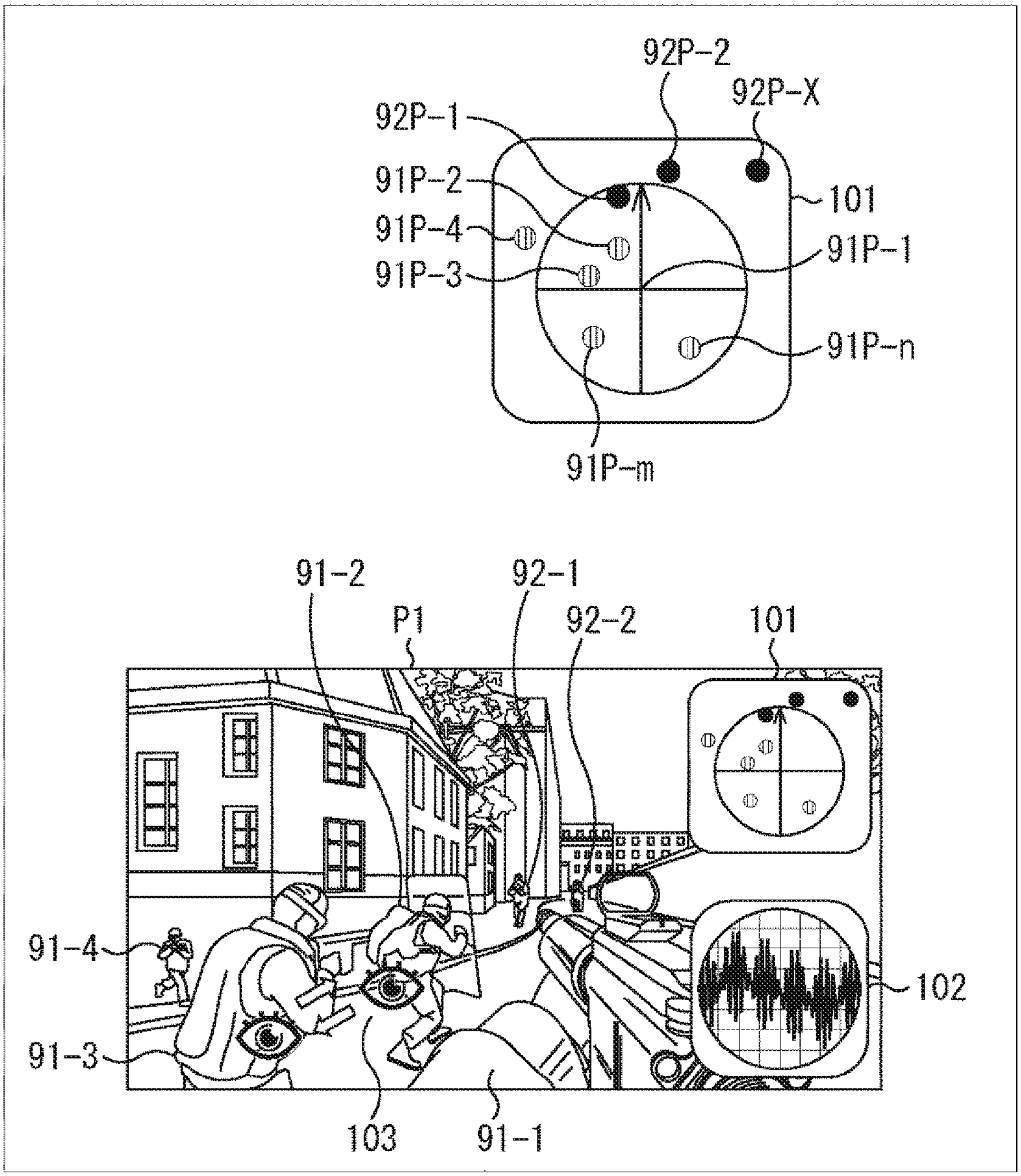
FIG. 3 is a diagram for explaining a feedback display column.

In addition, in the image P1, as shown in FIG. 3, a VR context information feedback display column 101 for feeding back the VR context information, an input situation feedback display column 102 for feeding back an input state (the voice data), and a mark 103 indicating the line of sight are provided.

In the image P1 of FIG. 3, on the basis of the context information acquired by the VR context information acquisition unit 39 and the behavior information and the attitude information acquired by the behavior information acquisition unit 40, an image to be viewed by the player controlled by the user H in the VR is displayed. Therefore, for example, in a case in which it is recognized on the basis of the context information, the behavior information, and the attitude information that the player is running and moving in a predetermined attitude toward the front, the surrounding landscape changes accordingly, and an image from which it is able to be recognized that the player is running and moving in a predetermined attitude toward the front is displayed as the image P1.

As shown in the upper right portion of the image P1 in FIG. 3, in the VR context information feedback display column 101, a point representing dispositions of nearby players when a direction of an upward arrow in the figure is set to be the front of the player is displayed around a point 91P-1 at which the position of the player controlled by the user H becomes an intersection of a horizontal direction straight line and a vertical direction straight line, based on the VR context information acquired by the VR context information acquisition unit 39 is displayed.

In FIG. 3, the point 91P-1 representing its own position as the center position is displayed so that the direction and the distance of the point representing the position where the other player is present are able to be recognized.

That is, as shown in FIG. 3, when viewed from the pointer 91P-1 that is the center position where the player controlled by the user H is present, points 91P-2 to 91P-4 representing positions of the fellow players are and a point 92P-1 representing a position of the enemy player are displayed on the left front side, points 92P-2 and 92P-x representing positions of the enemy players are displayed on the right front side, a point 91P-m representing a position of the fellow player is displayed on the left rear side, and a point 91P-n representing a position of the fellow player is displayed on the right rear side.

In addition, as shown in the lower right portion of the image P1 in FIG. 3, a waveform representing a signal level of the voice acquired by the voice acquisition unit 36 is displayed in the input situation feedback display column 102.

As described above, by viewing the image P1 as shown in FIG. 3, the user H is able to recognize the direction and distance of the player other than himself or herself in the VR, centering on himself or herself, and to recognize whether or not an input by the voice that he or she has spoken is sufficient.

In addition, a mark 103 indicating the line of sight is displayed on the lower left portion of the image P1 in FIG. 3 on the basis of the line of sight information acquired by the line of sight recognition processing unit 41. The mark 103 is an eye-pointing icon and is displayed at a position corresponding to the line of sight direction in the image P1 of the user H wearing the information processing device 11.

Display Example 1 of Utterance Range

Next, a display example 1 of the utterance range based on the pitch of the voice of his or her utterance will be described with reference to FIG. 4.

Figure 4:
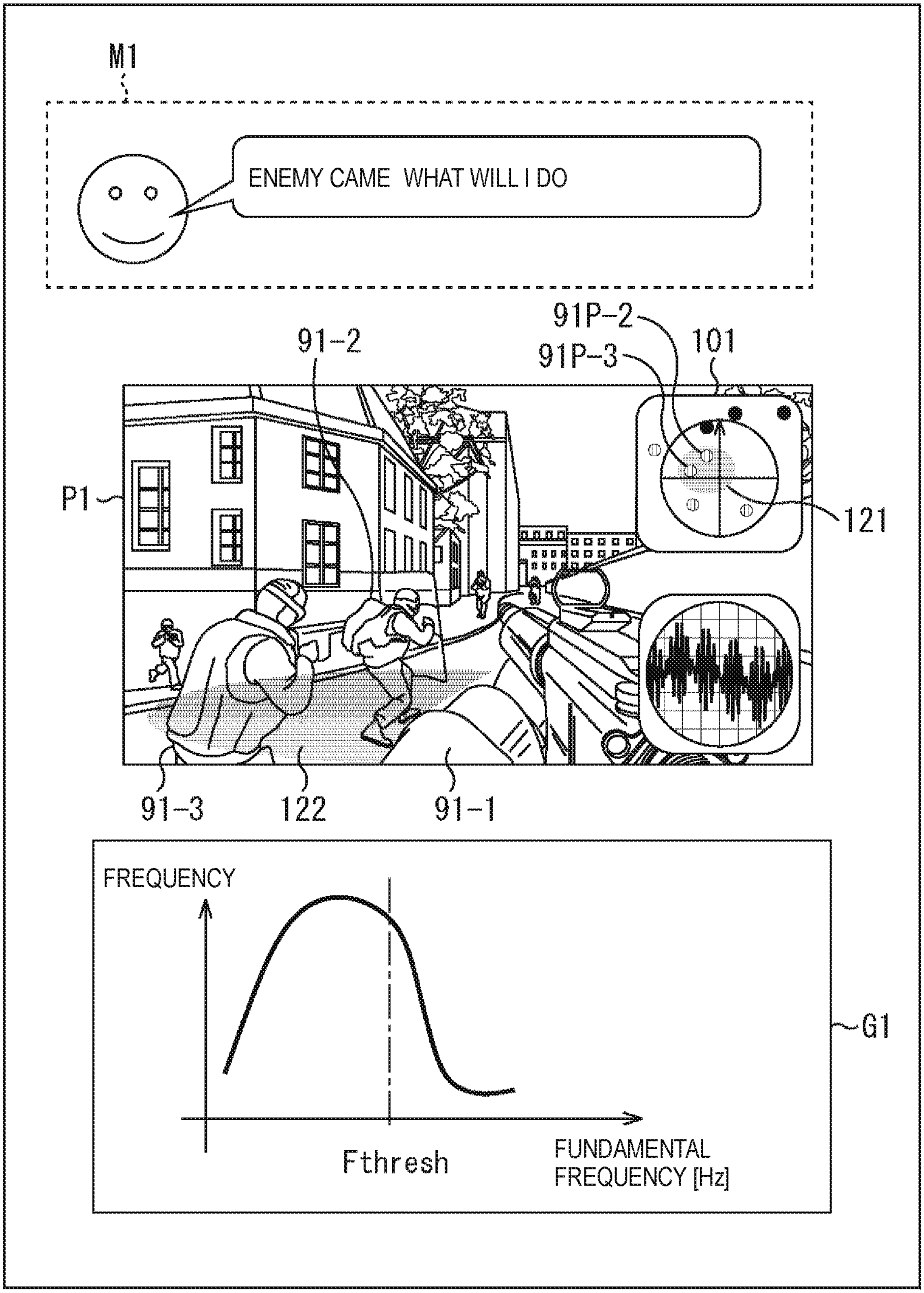
FIG. 4 is a diagram for explaining a display example 1 of an utterance range.

In a case in which while viewing the image P1 of FIG. 4, the user H views an approaching player as an enemy, for example, and there is an utterance such as "The enemy came What will I do", the voice acquisition unit 36 collects and acquires a voice spoken as a voice, and supplies the voice to the CPU 31 as the voice data. The utterance range control unit 31*a* controlled by the CPU 31 controls the communication unit 35 to transmit the voice data to the cloud server group 12.

As a result of this process, in a case in which the voice analysis processing unit 61 acquires the voice data, after carrying out a process suitable for analysis, such as a noise removal process, the voice analysis processing unit 61 analyzes the voice data, transmits the analysis result to the information processing device 11, and transmits the voice data to the voice recognition unit 62 and the emotion estimation processing unit 65. More specifically, on the basis of the voice data, the voice analysis processing unit 61 analyzes the type of language, a pitch of the voice spoken according to a rate of each fundamental frequency, a speech speed by the number of phonemes per unit time, volume, and presence or absence of intonation.

The voice recognition unit 62 recognizes the voice as a language on the basis of the voice data, converts the voice recognition result into, for example, text data, and supplies the text data to the natural language processing unit 63 and the text to speech unit 66.

The natural language processing unit 63 converts the voice recognition result obtained by the text data or the like so that the voice recognition result becomes a natural language from contexts before and after, and supplies a conversion result to the meaning analysis processing unit 64.

The meaning analysis processing unit 64 analyzes the meaning of the utterance of the user H on the basis of the conversion result supplied from the natural language processing unit 63 and supplies the meaning to the emotion estimation processing unit 65 as a meaning analysis result.

The emotion estimation processing unit 65 estimates the emotion of the user H on the basis of the voice data supplied from the utterance analysis processing unit 61 and the meaning analysis result of the meaning analysis processing unit 64 and transmits the emotion estimation result and the meaning analysis result to the information processing device 11.

The text to speech unit 66 generates synthesized voice by the TTS on the basis of the natural language process result obtained by the text data, and transmits the synthesized voice to the information processing device 11.

On the basis of the emotion estimation result and the meaning analysis result, the utterance range control unit 31*a* specifies the utterance range and displays the utterance range as, for example, an utterance range 121 in the VR context information feedback display column 101 and an utterance range 122 in the image P.

More specifically, the utterance range control unit 31*a* displays, for example, the utterance contents of the user H such as "The enemy came What will I do" on an upper portion of the image P1 in the image output unit 37 so as to be displayed in a display column M1 of FIG. 4, for example, on the basis of the meaning analysis result. In addition, the utterance range control unit 31*a* obtains a relationship between the fundamental frequency of the utterance and a generation frequency as shown by the waveform G1 in the lower portion of FIG. 4, for example, on the basis of the analysis result of the fundamental frequency of the voice data, and estimates the emotion on the basis of whether or not the generation frequency of a frequency band exceeding a threshold value Fthresh is high.

For example, as shown in the waveform diagram G1 at the lower portion of FIG. 4, in a case in which it is considered that the frequency of generation of the frequency band that does not exceed the threshold value Fthresh is high and the voice is spoken in a low voice, the utterance range control unit 31*a* regards the voice is calmly spoken and regards the voice is generated only to a player extremely close to the player of the user H.

At this time, for example, the utterance range control unit 31*a* displays the utterance range 121 in the VR context information feedback display column 101 of FIG. 4. That is, in the utterance range 121 in the VR context information feedback display column 101 of FIG. 4, a range including the points 91P-2 and 91P-3 indicating the positions of the players 91-2 and 91-3 who are extremely close to the point 91P-1 indicating the position of the player of the user H is determined as the utterance range, and for example, is displayed as the utterance range 121.

Similarly, the utterance range control unit 31*a* displays the range in which the players 91-2 and 91-3 who are extremely close to the point indicating the position of the player 91-1 of the user H in the image P1 are present as the utterance range 122.

In a case in which the utterance range is determined as described above, the information spoken by the user afterwards is transmitted only to the player within the utterance range by a process that will be described later.

Since the utterance ranges 121 and 122 are displayed in the image P1 as described above, the user H is able to recognize his or her utterance range only by looking at the utterance ranges 121 and 122 in the image output unit 37.

As a result, since the user is able to execute the utterance in a state in which the user recognizes to which the partner the information spoken by himself or herself is now transmitted, it is possible to reduce anxiety that the user speaks in a state in which the user does not know to whom the utterance is transmitted in the utterance.

In addition, the display of the text data of the utterance content of the user H, such as "The enemy came What will I do" shown in the display column M1 of FIG. 4 may be transmitted to the user H in other way. For example, the synthesized voice may be generated by the text to speech unit 66 and the synthesized voice may be output as the voice from the voice output unit 38.

In addition, in the following description, a process result obtained by a process similar to the process by the voice analysis processing unit 61, the voice recognition unit 62, the natural language processing unit 63, the meaning analysis processing unit 64, the emotion estimation processing unit 65, and the text to speech unit 66 of the cloud server group 12, which is described with reference to FIG. 4 is collectively referred to as an utterance process result, if necessary, and the description thereof will be omitted as appropriate.

Display Example 2 of Utterance Range 2

Next, a display example 2 of the utterance range based on an utterance of another player will be described with reference to FIG. 5.

Figure 5:
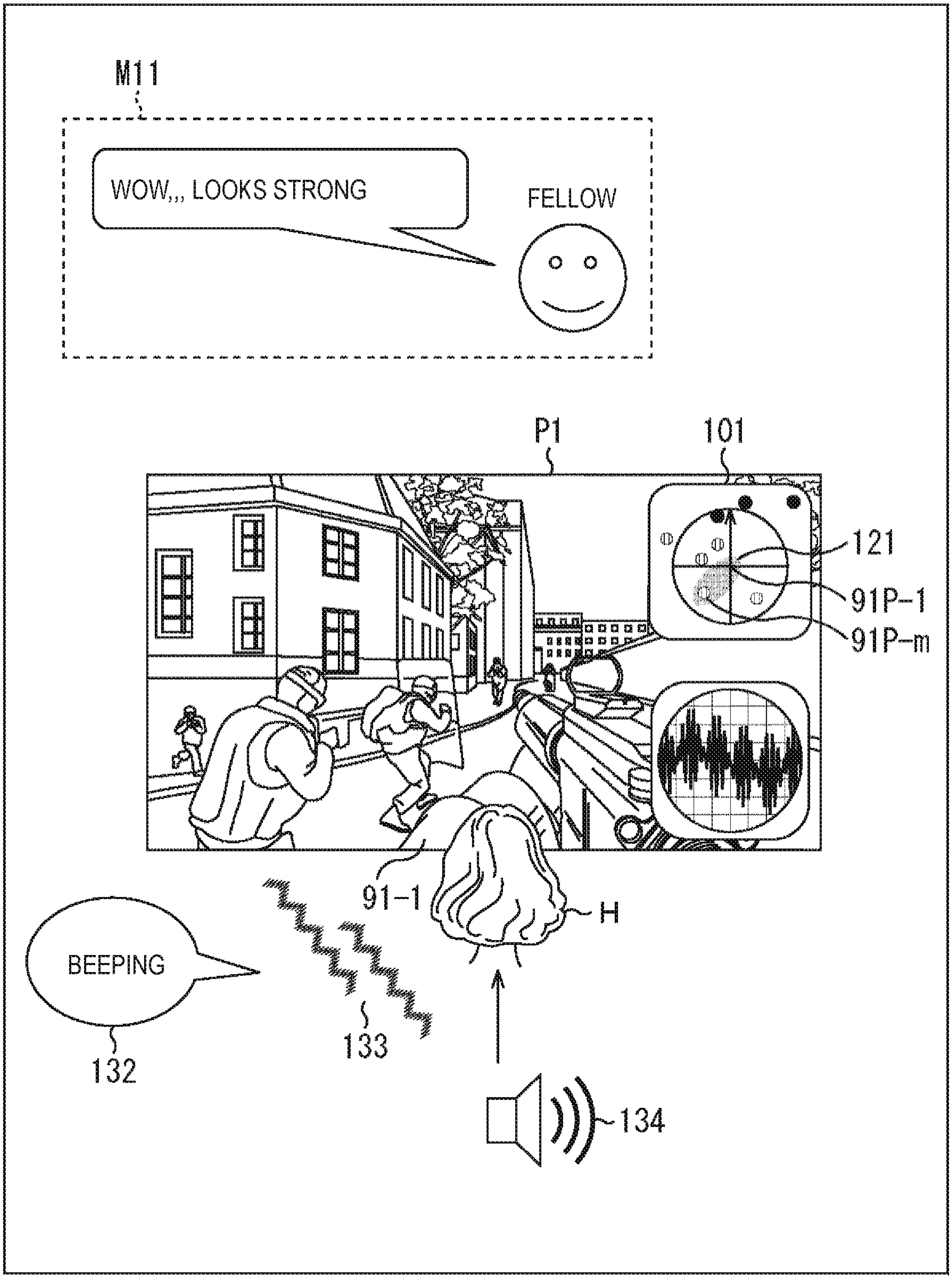
FIG. 5 is a diagram for explaining a display example 2 of the utterance range.

For example, in a case in which the player 91-*m* who is not displayed in the image P1 at the left rear side of the user H in the VR context information feedback display column 101 of FIG. 5 has spoken "Wow , , , looks strong" the voice acquisition unit 36 of the information processing device 11 possessed by the user, who is a user other than the user H and operates the player 91-*m* collects and acquires a voice spoken as a voice, and supplies the voice to the CPU 31 as the voice data. The utterance range control unit 31*a* controlled by the CPU 31 controls the communication unit 35 to transmit the voice data to the cloud server group 12. In a case in which the utterance range control unit 31*a* acquires the voice data as the voice process result by a series of processes described above, the utterance range control unit 31*a* determines the utterance range by processes similar to the series of processes described above. In addition, the utterance range control unit 31*a* transmits the information associated with the determined utterance range and the utterance process result to the other information processing devices 11.

The utterance range control unit 31*a* of the information processing device 11 worn by the user H controls the communication unit 35 to acquire information associated with the utterance range transmitted from the other information processing device 11.

Here, the voice process result is synthesized voice based on text data such as "Wow , , , looks strong" recognized from the voice data by the natural language processing unit 63 and text data such as "Wow , , , looks strong" generated by the text to speech unit 66.

The utterance range control unit 31*a* recognizes the utterance range of the player 91-*m* on the basis of the VR context information of the player 91-*m* acquired by the VR context information acquisition unit 39 and the information associated with the utterance range from the information processing device 11 worn by the user corresponding to the player 91-*m*. In addition, for example, in the VR context information feedback display column 101, the utterance range control unit 31*a* displays the utterance range of the player 91-*m*, for example, as the utterance range 121 of FIG. 5. In the utterance range 121, a center position of the VR context information feedback display column 101 indicating the position where the user H is present and the pointer 91P-m in the VR of the pointer 91P-m are included.

For example, the utterance range control unit 31*a* displays the utterance contents of the user H such as "Wow , , , looks strong" on the basis of the natural language process result, for example, in the upper portion of the image P1 in the image output unit 37 as shown in the display column M11 of FIG. 5.

Since the utterance range 121 is displayed in the image P1 as described above, the user H is able to recognize the utterance range of the player other than himself or herself by simply looking at the utterance range 121 in the image output unit 37.

In addition, the utterance range may be expressed by another method of displaying the utterance range as an image on the image output unit 37 as shown in the utterance ranges 121 and 122 of FIG. 5.

For example, as shown in the lower left portion of FIG. 5, the utterance range control unit 31*a* may control the voice output unit 38 on the basis of the context information of the player 91-*m* to output a warning sound 132 of "beeping" from the left rear side that is a direction corresponding to the position in the VR context information feedback display column 101. At this time, it is possible to recognize the direction and the distance of the utterance range only by the voice by setting the voice to be a large volume when the distance is short and to be a small volume when the distance is far.

In addition, for example, as shown in the center lower portion of FIG. 5, the utterance range control unit 31*a* may control the vibration unit 34 on the basis of the context information of the player 91-*m* to generate a warning vibration 133 from the left rear side corresponding to the position in the VR context information feedback display column 101. At this time, it is possible to recognize the direction and the distance of the utterance range only by the vibration by setting the vibration to be a large vibration when the distance is short and to be a small vibration when the distance is far.

Furthermore, for example, as shown in the lower right portion of FIG. 5, the utterance range control unit 31*a* may control the voice output unit 38 on the basis of the context information of the player 91-*m* to output a warning synthesized sound 134 of "Wow , , , looks strong" generated by the text to speech unit 66 from the left rear side corresponding to the position in the VR context information feedback display column 101. At this time, it is possible to recognize the direction and the distance of the utterance range only by the voice by setting the voice to be a large volume when the distance is short and to be a small volume when the distance is far.

As described above, the utterance range may be expressed not only by the image but also by the warning sound, the warning vibration, the warning synthesized sound, and the like, so that the direction and the distance of the player that is present within the utterance range is able to be known to the user H as described above.

As a result, since it is possible to speak while checking which the partner's voice is transmitted, in the utterance, it is possible to speak while recognizing to whom to respond to the utterance. Therefore, it is possible to reduce anxiety that the user speaks in a state in which the user does not know to whom the utterance is transmitted in the utterance.

Display Example 3 of Utterance Range

Next, a display example 3 of the utterance range based on the speech speed of the voice of his or her utterance will be described with reference to FIG. 6.

In a case in which while viewing the image P1, the user H views the approach of the player of the enemy, for example, and there is an utterance such as "Zenpounii-, chuumokuu-, reaaitemuwoo-, hojishiteiruu-, kanouseigaa-, a-rimasu-(Forwaaard, attentiooon, theeere is possibiliteee of hooolding of rare iteeem)", the voice acquisition unit 36 collects and acquires a voice spoken as a voice, and supplies the voice data to the CPU 31 as the voice data. The utterance range control unit 31*a* controlled by the CPU 31 controls the communication unit 35 to transmit the voice data to the cloud server group 12.

The utterance range control unit 31*a* determines the utterance range on the basis of the utterance process result obtained by the process of the cloud server group 12, and displays the utterance range, for example, as the utterance range 121 in the VR context information feedback display column 101 and the utterance 122 in the image P1. Here, for example, the use of the voice process result is the voice analysis result and the natural language process result.

Figure 6:
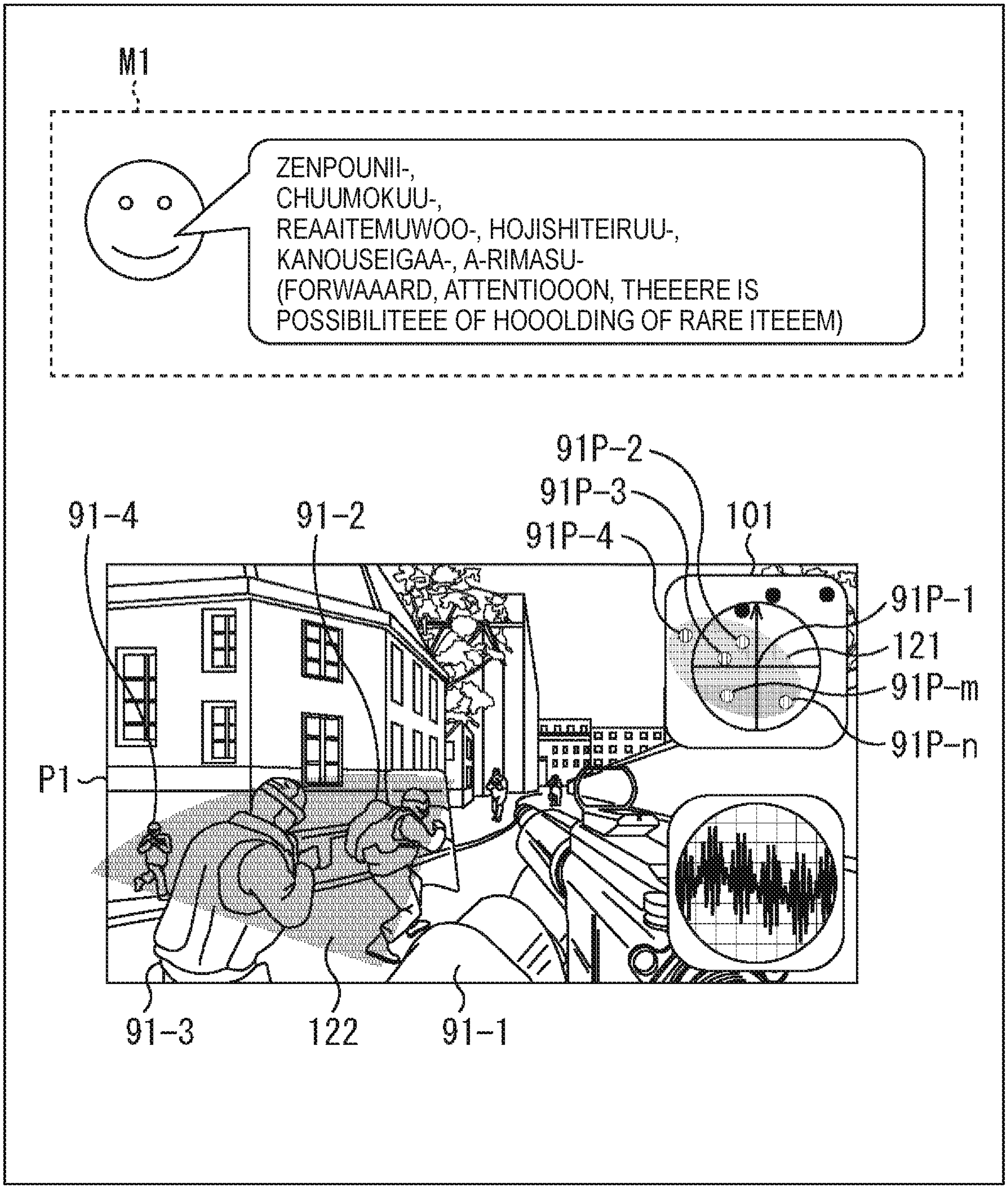
FIG. 6 is a diagram for explaining a display example 3 of the utterance range.

More specifically, the utterance range control unit 31*a* displays the utterance content of the user H, such as "Zenpounii-, chuumokuu-, reaaitemuwoo-, hojishiteiruu-, kanouseigaa-, a-rimasu-(Forwaaard, attentiooon, theeere is possibiliteee of hooolding of rare iteeem)", for example, on the upper portion of the image P1 in the image output unit 37 as shown in the display column M21 of FIG. 6, on the basis of the natural language process result. In addition, the utterance range control unit 31*a* determines, for example, which player in the vicinity of the user H is an utterance on the basis of the magnitude of the number of phonemes per unit time, that is, the voice analysis result of the speech speed. For example, in a case of FIG. 6, since it is presumed that the speech speed is slow because there is a long note, the utterance range control unit 31*a* regards that the speech speed is lower than the predetermined speed and the utterance is for all the players who are the fellows who are closely present.

At this time, for example, the utterance range control unit 31*a* displays the utterance range 121 in the VR context information feedback display column 101 of FIG. 6. That is, in the utterance range 121 in the VR context information feedback display column 101 of FIG. 6, a range including the points 91P-2 to 91P-4 and P1P-m indicating the positions of the players 91-2 to 91-4, 91-*m*, and 91-*n* who are the fellows close to the position of the player 91-1*r* of the user H is displayed as the utterance range 121.

Similarly, the utterance range control unit 31*a* displays the range in which the players 91-2 to 91-4 of our forces close to the position of the player 91-1 of the user H in the image P1 are present as the utterance range 122.

Since the utterance ranges 121 and 122 are displayed in the image P1 as described above, the user H is able to recognize his or her utterance range only by looking at the utterance ranges 121 and 122 in the image output unit 37.

As a result, since it is possible to execute the utterance after confirming the partner to whom the utterance is transmitted and it is possible to speak while confirming which party to whom the utterance is transmitted at the time of utterance, it is possible to reduce anxiety that the user speaks in a state in which the user does not know to whom the utterance is transmitted in the utterance.

Display Example 4 of Utterance Range

Next, a display example 4 of the utterance range based on the VR context information will be described with reference to FIG. 7.

Figure 7:
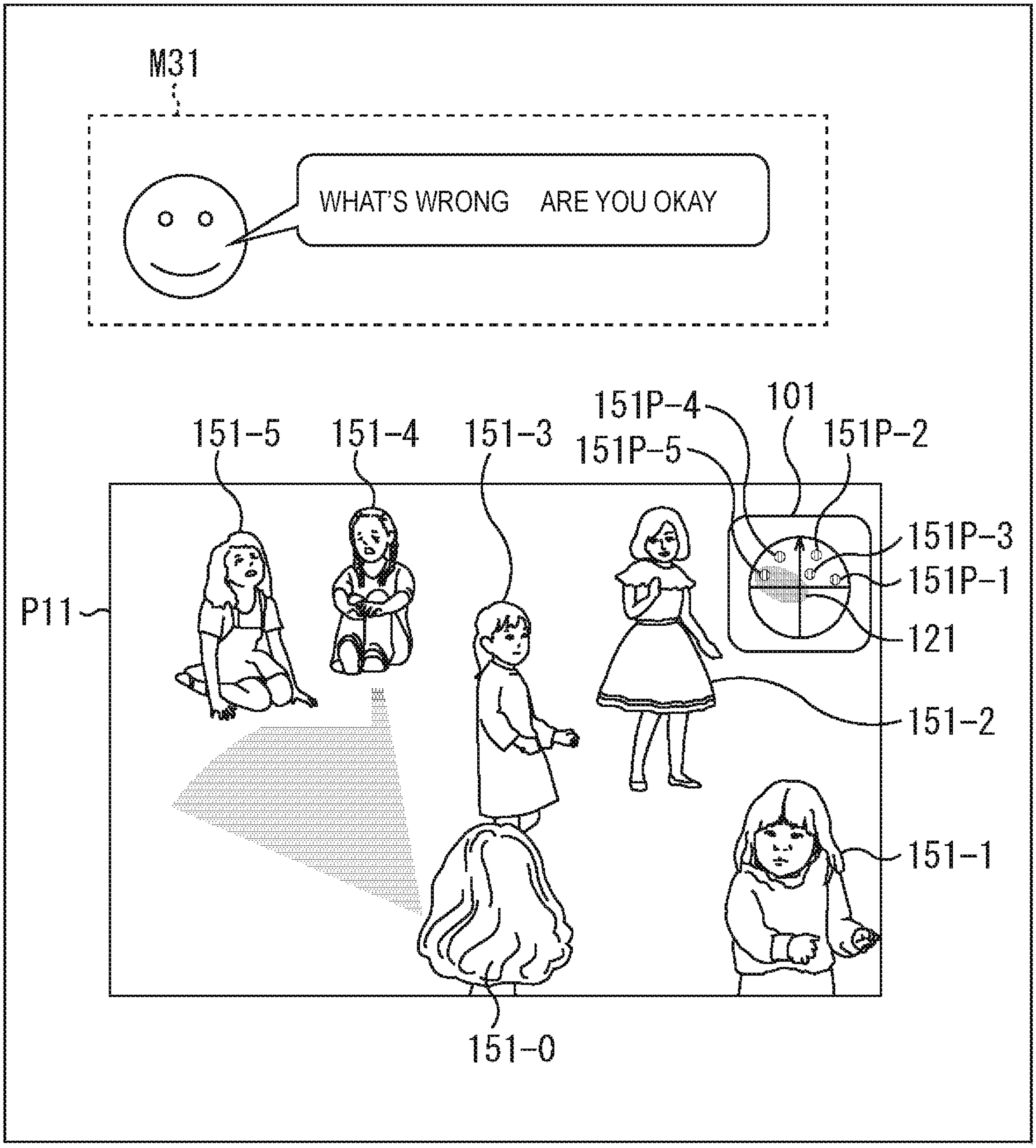
FIG. 7 is a diagram for explaining a display example 4 of the utterance range.

For example, in a case in which while the user H is watching the image P2 of FIG. 7, for example, and there is an utterance such as "What's wrong Are you okay", the voice acquisition unit 36 collects and acquires a voice spoken as a voice, and supplies the voice to the CPU 31 as the voice data. The utterance range control unit 31*a* controlled by the CPU 31 controls the communication unit 35 to transmit the voice data to the cloud server group 12.

The utterance range control unit 31*a* identifies the utterance range on the basis of the natural language process result and the emotion estimation result among the utterance process results obtained from the cloud server group 12 and displays the utterance range, for example, as the utterance range 121 in the VR context information feedback display column 101 and the utterance range 122 in the image P2. Here, in the image P2, a player 151-0 controlled by the user H and players 151-1 to 151-5 of children are displayed. Among these, the player 151-1 of the child is laughing, the player 151-2 is masquerading, the player 151-3 is playing, and the players 151-4 and 15-5 are crying. The states of the players 151-1 to 151-5 of the respective children are included in the VR context information.

Therefore, in this case, the utterance range control unit 31*a* displays, for example, "What's wrong Are you okay" that is the natural language process result on the upper portion of the image P1 in the image output unit 37 as shown in the display column M31 of FIG. 7. In addition, on the basis of the emotion estimation result, the utterance range control unit 31*a* determines, whether an utterance is an utterance to the crying player in the vicinity of the user H or not, for example, on the basis of the analysis result of whether or not an input voice of the voice data by the emotion estimation processing unit 65 is small and gently spoken. For example, in a case of FIG. 7, since the players 151-4 and 151-5 are crying, the utterance range control unit 31*a* regards that the utterance is given gently to the crying child and the utterance is for the crying child player.

At this time, for example, the utterance range control unit 31*a* displays the utterance range 121 in the VR context information feedback display column 101 of FIG. 7. That is, in the utterance range 121 in the VR context information feedback display column 101 of FIG. 7, a range including points 151P-4 and 151P-5 indicating the position of the player 151-0 of the user H and the positions of the crying players 151-4 and 151-5 is displayed as the utterance range 121.

Similarly, the utterance range control unit 31*a* displays the range where the player 151-0 of the user H and the players 151-4 and 151-5 of the crying children in the image P2 are present as the utterance range 122.

Since the utterance ranges 121 and 122 are displayed in the image P2 as described above, the user H is able to recognize his or her utterance range only by looking at the utterance ranges 121 and 122 in the image output unit 37.

As a result, since it is possible to execute the utterance after confirming the partner to whom the utterance is transmitted and it is possible to speak while confirming which party to whom the utterance is transmitted at the time of utterance, it is possible to reduce anxiety that the user speaks in a state in which the user does not know to whom the utterance is transmitted in the utterance.

Display Example 5 of Utterance Range

Next, a display example 5 of the utterance range based on the behavior information and the attitude information will be described with reference to FIG. 8.

The utterance range control unit 31*a* specifies the utterance range on the basis of the behavior information and the attitude information, and displays the utterance range, for example, as the utterance range 121 in the VR context information feedback display column 101 and the utterance range 122 in the image P1.

More specifically, in a case in which the user H is standing and running on the basis of the behavior information and the attitude information, for example, the utterance range control unit 31*a* determines a player for which the utterance is in the vicinity of the user H on the basis of the VR context information.

Figure 8:
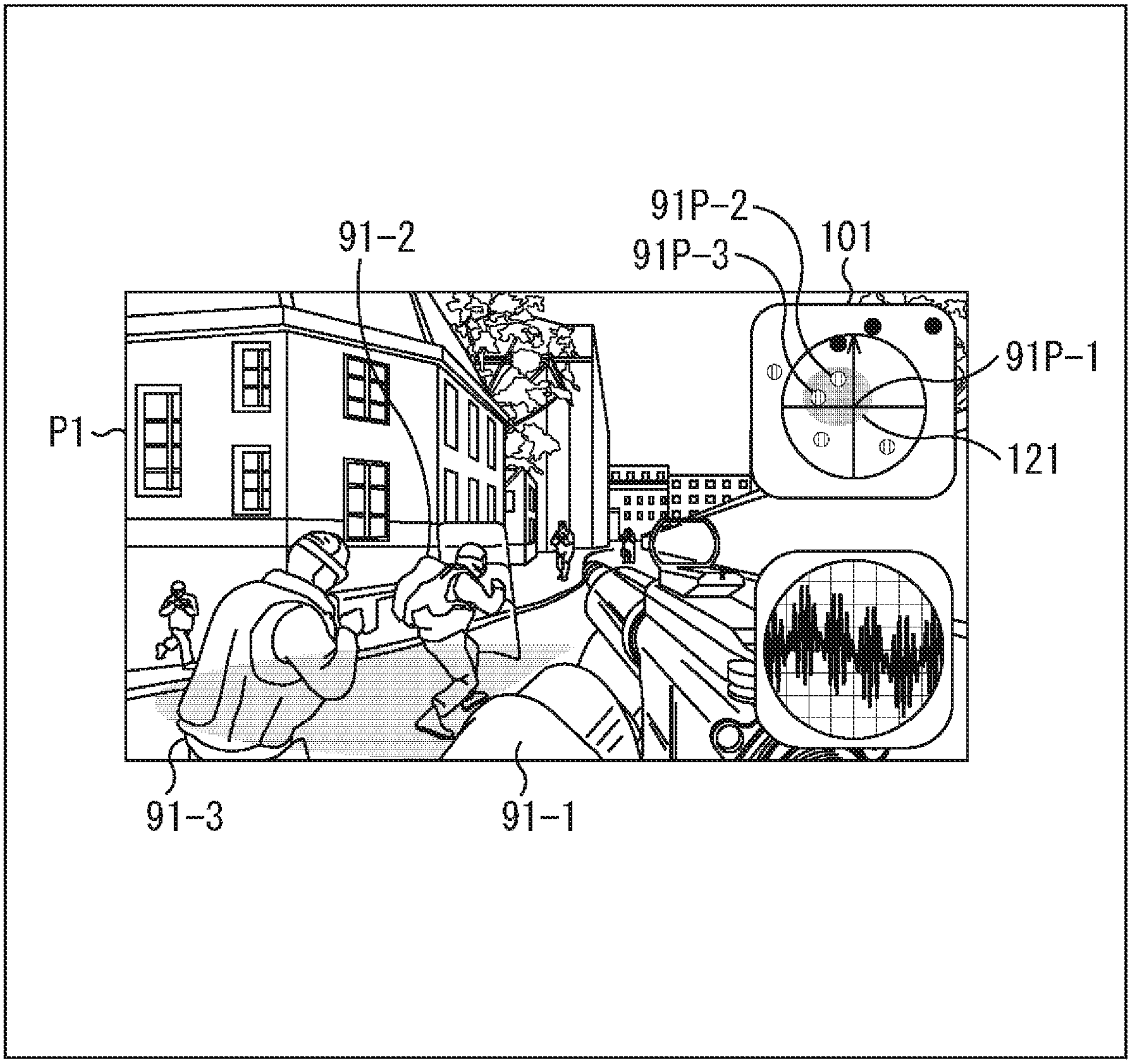
FIG. 8 is a diagram for explaining a display example 5 of the utterance range.

For example, in a case of FIG. 8, since a player 91-1 controlled by the user H is standing and running, the utterance range control unit 31*a* regards that the utterance is for a player who is standing and running similarly in the vicinity of the user H, on the basis of the VR context information.

At this time, for example, the utterance range control unit 31*a* displays the utterance range 121 in the VR context information feedback display column 101 of FIG. 8. That is, in the utterance range 121 in the VR context information feedback display column 101 of FIG. 8, a range including the points 91P-2 and 91P-3 indicating the positions of the players 91-2 and 91-3 of our forces who are close to the point 91P-1 indicating the position of the player 91-1 of the user H is displayed as the utterance range 121.

Similarly, the utterance range control unit 31*a* displays the range in which the players 91-2 and 91-3 of the fellows close to the position of the player 91-1 of the user H in the image P1 are present as the utterance range 122.

Since the utterance ranges 121 and 122 are displayed in the image P1 as described above, the user H is able to visually recognize a range where the player who takes behavior and attitude similarly to those of himself or herself is present as the utterance range by only looking at the utterance ranges 121 and 122 in the image output unit 37.

As a result, since it is possible to make the utterance after confirming the partner to whom the utterance is transmitted and it is possible to speak while confirming which party to whom the utterance is transmitted at the time of utterance, it is possible to reduce anxiety that the user speaks in a state in which the user does not know to whom the utterance is transmitted in the utterance.

Display Example 6 of Utterance Range

Next, a display example 6 of the utterance range based on the line of sight information of the user H will be described with reference to FIG. 9.

The utterance range control unit 31*a* specifies the utterance range on the basis of the line of sight information, and displays the utterance range, for example, as the utterance range 121 in the VR context information feedback display column 101 and the utterance range 122 in the image P1.

More specifically, on the basis of the line of sight information, the utterance range control unit 31*a* determines a player to which the line of sight is directed in the image P1, and determines a player to be set as the utterance range in the vicinity of the user H.

Figure 9:
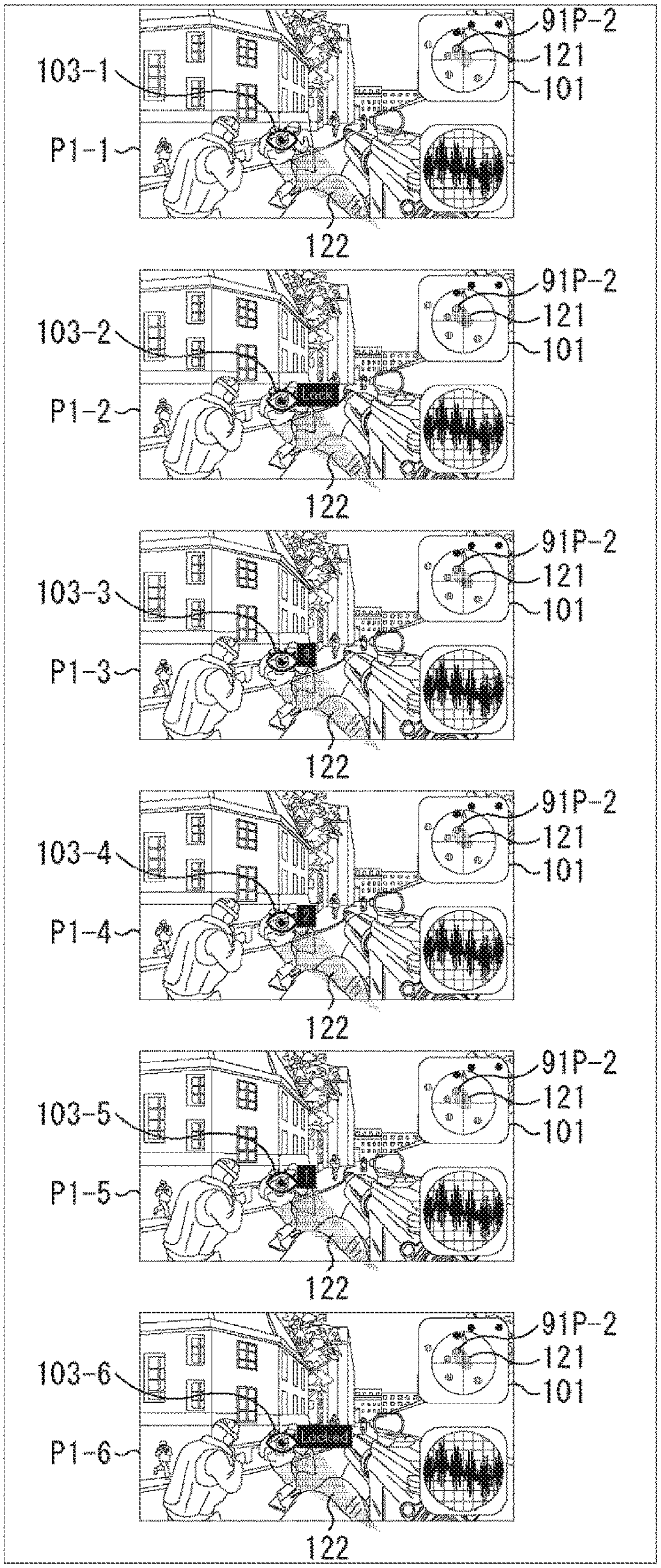
FIG. 9 is a diagram for explaining a display example 6 of the utterance range.

For example, in a case of FIG. 9, the utterance range control unit 31*a* recognizes that the line of sight is directed to a player 91-2 in the vicinity of the user H on the basis of the line of sight information.

At this time, for example, the utterance range control unit 31*a* displays the utterance range 121 in the VR context information feedback display column 101 as shown by the image P1-1 of FIG. 9. That is, as shown in the image P1-1 of FIG. 9, in the utterance range 121 in the VR context information feedback display column 101, a range including a position of an intersection point (hereinafter referred to as an intersection point position) of a straight line of a horizontal direction and a straight line of a vertical direction in a circle of the VR context information feedback display column 101 which is the position of the player 91-1 controlled by the user H, and a point 91P-2 indicating a position of the player 91-2 is displayed as the utterance range 121.

Similarly, as shown by the image P1-1 of FIG. 9, the utterance range control unit 31*a* displays the point indicating the position of the player of the user H and the range where the player 91-2 of the fellow in a line of sight direction of the user H is present as the utterance range 122, and further displays a mark 103-1 indicating that the line of sight is directed on the player 91-2.

Furthermore, in a case in which a predetermined time has elapsed, as shown by the image P1-2 of FIG. 9, in order to indicate that the predetermined time has elapsed since the line of sight is directed, the utterance range control unit 31*a* displays a mark 103-2 instead of the mark 103-1 indicating that the line of sight is directed on the player 91-2.

Furthermore, in a case in which a predetermined time has elapsed, as shown by the image P1-3 of FIG. 9, in order to indicate that a remaining time is 3 seconds from a time at which the line of sight is directed to a timing at which the line of sight direction is determined, the utterance range control unit 31*a* displays a mark 103-3 instead of the mark 103-2 indicating that the line of sight is directed on the player 91-2.

Furthermore, in a case in which a predetermined time has elapsed, as shown by the image P1-4 of FIG. 9, in order to indicate that a remaining time is 2 seconds from a time at which the line of sight is directed to a timing at which the line of sight direction is determined, the utterance range control unit 31*a* displays a mark 103-4 instead of the mark 103-3 indicating that the line of sight is directed on the player 91-2.

Furthermore, in a case in which a predetermined time has elapsed, as shown by the image P1-5 of FIG. 9, in order to indicate that a remaining time is 1 second from a time at which the line of sight is directed to a timing at which the line of sight direction is determined, the utterance range control unit 31*a* displays a mark 103-5 instead of the mark 103-4 indicating that the line of sight is directed on the player 91-2.

Furthermore, in a case in which a predetermined time has elapsed, as shown by the image P1-6 of FIG. 9, in order to indicate that the line of sight direction is determined, the utterance range control unit 31*a* displays a mark 103-6 instead of the mark 103-5 indicating that the line of sight is directed on the player 91-2.

Since the utterance ranges 121 and 122 are displayed in the image P1 as described above, the user H is able to determine that transmission of an eye contact by the line of sight to a specific player as the utterance range by simply looking at the utterance ranges 121 and 122 in the image output unit 37.

As a result, it is possible to recognize whether or not a cue by the line of sight such as an eye contact is transmitted, and it is possible to determine the utterance range by the line of sight.

Display Example 7 of Utterance Range

Next, a display example 7 of the utterance range based on line of sight information of the other player will be described with reference to FIG. 10. Here, by the process described with reference to FIG. 9, it is an example in which the utterance range is displayed so that the user H is able to recognize that the eye contact is directed to the user H from the player of the fellow and an eye contact is established in a case in which the line of sight is transmitted according to the transmitted eye contact. For example, in the image of FIG. 9, the utterance range control unit 31*a* controls the communication unit 35. The context information including the line of sight information is transmitted from another information processing device 11 worn by the user who controls the player to whom the line of sight is directed.

Figure 10:
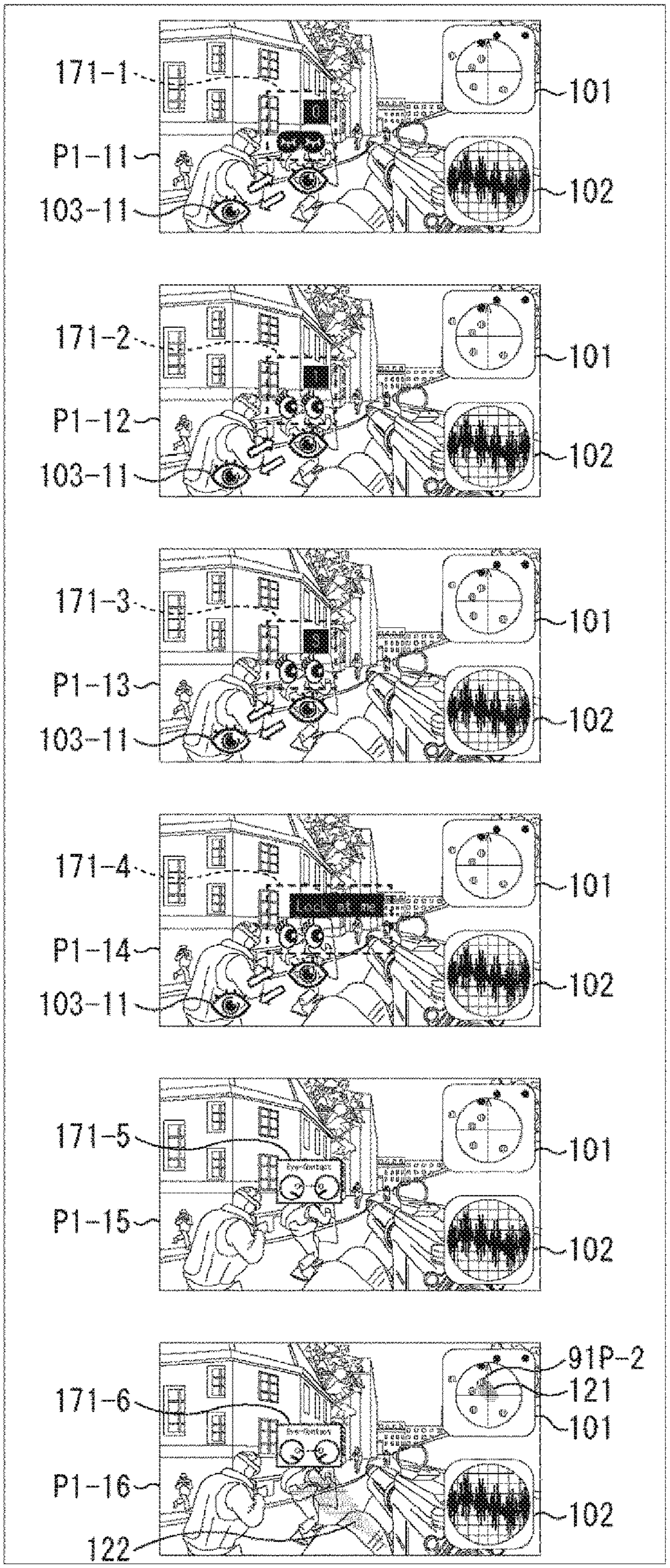
FIG. 10 is a diagram for explaining a display example 7 of the utterance range.

Therefore, the utterance range control unit 31*a* specifies the utterance range on the basis of the line of sight information from the other information processing device 11 worn by the user who controls the other player, and displays information indicating that the line of sight is transmitted, for example, in the image P1 of FIG. 10.

More specifically, on the basis of the line of sight information included in the context information from the information processing device 11 of the other player, the utterance range control unit 31*a* determines from which player the line of sight is directed in the image P1, and determines a player to be set as the utterance range in the vicinity of the user H. For example, in a case of FIG. 10, the utterance range control unit 31*a* recognizes that the line of sight from the player 91-2 is directed on the basis of the line of sight information of the other player.

As shown by the image P1-11 of FIG. 10, the utterance range control unit 31*a* displays a mark 171-1 indicating that the line of sight is directed on the player 91-2 of the fellow to which the line of sight is directed.

Furthermore, in a case in which a predetermined time has elapsed, as shown by the image P1-12 of FIG. 10, in order to indicate the elapsed time since the line of sight is directed, the utterance range control unit 31*a* displays a mark 171-2 instead of the mark 171-1 indicating that the line of sight is directed on the player 91-2.

Furthermore, in a case in which a predetermined time has elapsed, as shown by the image P1-13 of FIG. 10, in order to indicate the elapsed time since the line of sight is directed, the utterance range control unit 31*a* displays a mark 171-3 instead of the mark 171-2 indicating that the line of sight is directed on the player 91-2.

Furthermore, in a case in which a predetermined time has elapsed, as shown by the image P1-14 of FIG. 10, in order to indicate the elapsed time since the line of sight is directed, the utterance range control unit 31*a* displays a mark 171-4 instead of the mark 171-3 indicating that the line of sight is directed on the player 91-2. "Look at me" is described in the mark 171-4 and an intention for indicating that the mark 171-4 corresponds to an eye contact is described in the mark 171-4.

Here, in a case where the user H turns his or her line of sight to the mark 171-4, as shown by the image P1-15 of FIG. 10, in order to indicate that the eye contact is established, the utterance range control unit 31*a* displays a mark 171-5 indicating that the eye contact with the player 91-2 is able to be confirmed instead of the mark 171-4. "Eye contact" is described in the mark 171-5, and the mark 171-5 indicates that the eye contact is established. In addition, in this case, the similar display is made in the other information processing device 11 to be the partner.

Furthermore, in a case in which a predetermined time has elapsed, as shown by the image P1-16 of FIG. 10, in order to indicate that the eye contact is able to be confirmed and the utterance range is determined, the utterance range control unit 31*a* displays the utterance range 121 in the VR context information feedback display column 101. That is, as shown by the image P1-16 of FIG. 10, in the VR context information feedback display column 101, the utterance range control unit 31*a* displays the range including the intersection point position indicating the positions of the player of the user H and the player 91-2, and the point 91P-2 as the utterance range 121. Similarly, as shown by the image P1-16 of FIG. 10, the utterance range 122 including the player 91-1 and the player 91-2 of the user H is displayed.

As described above, since the utterance ranges 121 and 122 are displayed in the mutual image P1 of the player who transmits the eye contact by performing the process of transmitting the eye contact described with reference to FIG. 9 and the process of receiving the eye contact, the user who transmits the eye contact is able to recognize that the eye contact with the player of the partner is established and recognize the mutual utterance range by simply looking the utterance ranges 121 and 122 in the image output unit 37.

As a result, it is possible to recognize whether or not communication is made by means of a cue of simply directing the line of sight such as the eye contact, it is possible to confirm the utterance range only with the line of sight. For example, after the eye contact is established, since the utterance range is set within the players who have established the eye contact, it is possible to realize a conversation only between players who have established the eye contact.

In addition, the eye contact is able to be exchanged by the process described with reference to FIGS. 9 and 10. However, for example, it is necessary to instantaneously exchange the eye contact for soccer, basketball, and the like, and as described above, it is not able to withstand use with an eye contact that takes a few seconds.

Therefore, instead of establishing the eye contact according to the time to transmit the line of sight as described above, even for a moment, the eye contact may be established in a case in which mutual line of sights satisfy a predetermined condition. For example, in a case in which an inner product of vectors indicating mutual line of sight directions is smaller than a predetermined value by using the mutual line of sight information of the players, it may be regarded that the mutual line of sight directions coincide with each other and the eye contact is established.

Example 1 in which Transmission of Information is Controlled According to Situation in which Utterance Range is Determined Next, referring to FIG. 11, an example 1 in which the transmission of the information is controlled according to the situation in which the utterance range is determined by the above-described process will be described.

In the state in which the utterance range is determined by the above-described process, in a case in which while viewing the image P1, the user H views an approaching player as an enemy, for example, and there is an utterance such as "The enemy came What will I do", the voice acquisition unit 36 collects and acquires a voice spoken as a voice, and supplies the voice to the CPU 31 as the voice data. The utterance range control unit 31*a* controlled by the CPU 31 controls the communication unit 35 to transmit the voice data to the cloud server group 12.

As a result of this process, in a case in which the voice analysis processing unit 61 acquires the voice data, after carrying out a process suitable for analysis, such as a noise removal process, the voice analysis processing unit 61 analyzes the voice data, transmits the analysis result to the information processing device 11, and transmits the voice data to the voice recognition unit 62 and the emotion estimation processing unit 65. More specifically, on the basis of the voice data, the voice analysis processing unit 61 analyzes a pitch of the voice spoken according to a rate of each fundamental frequency, a speech speed by the number of phonemes per unit time, volume, and presence or absence of intonation.

The voice recognition unit 62 recognizes the voice as a language on the basis of the voice data, converts the voice recognition result into, for example, text data, and supplies the text data to the natural language processing unit 63 and the text to speech unit 66.

The natural language processing unit 63 converts the recognition information including the text data or the like into the natural language from the contexts before and after, and supplies the text data as the conversion result to the meaning analysis processing unit 64.

The meaning analysis processing unit 64 analyzes the meaning of the utterance of the user H on the basis of the conversion result supplied from the natural language processing unit 63 and supplies the meaning analysis result that is the analysis result to the emotion estimation processing unit 65.

The emotion estimation processing unit 65 estimates the emotion of the user H on the basis of the voice data supplied from the utterance analysis processing unit 61 and the analysis result of the meaning analysis processing unit 64 and transmits the emotion estimation result and the meaning analysis result to the information processing device 11.

The text to speech unit 66 generates synthesized voice by the TTS on the basis of the natural language process result obtained by the text data, and transmits the synthesized voice to the information processing device 11.

On the basis of the emotion estimation result and the natural language process result, the transmission control unit 31*b* identifies the utterance range and displays utterance range as, for example, the utterance range 121 in the VR context information feedback display column 101 and the utterance range 122 in the image P1.

Figure 11:
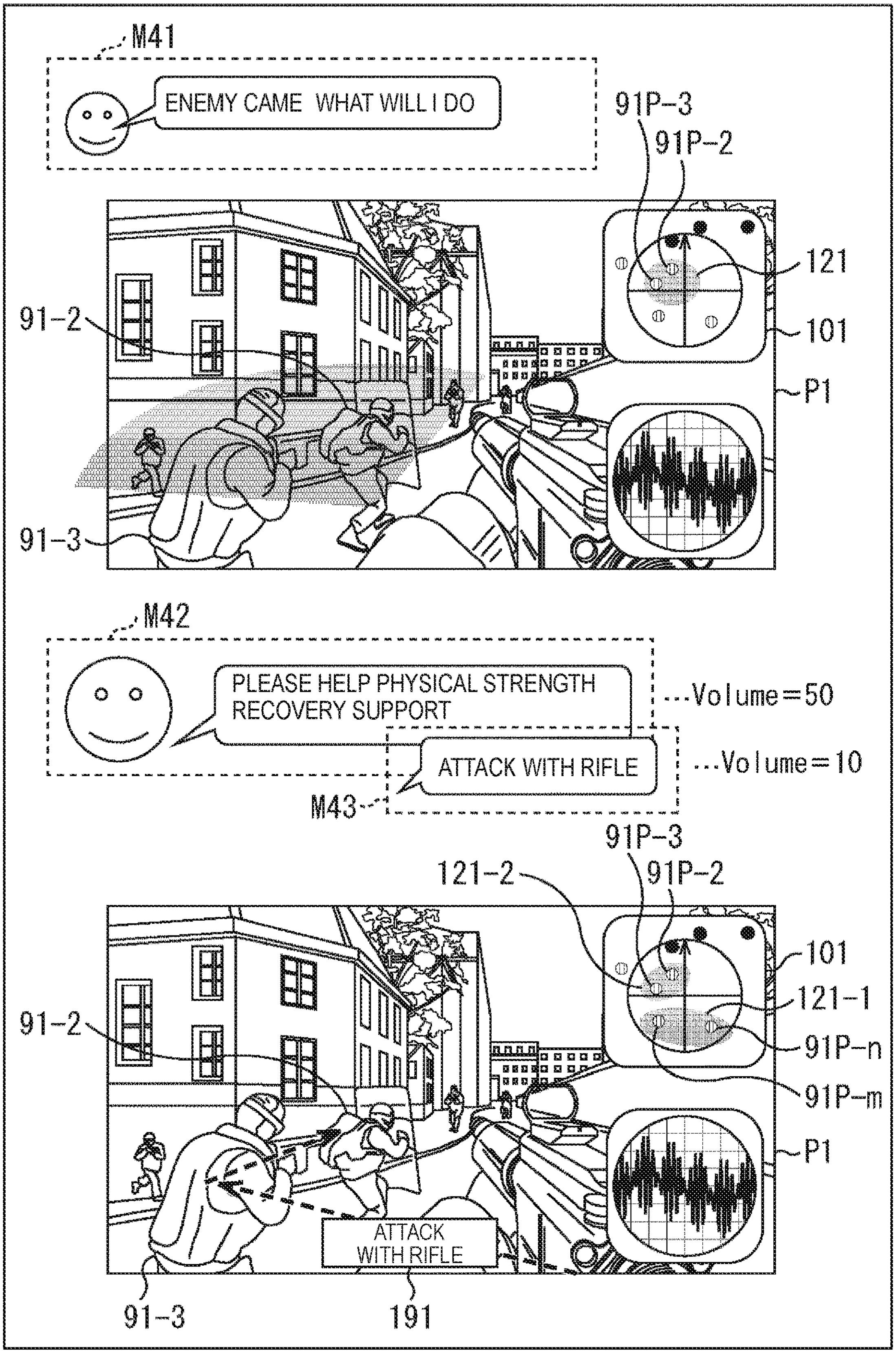
FIG. 11 is a diagram for explaining an example 1 in which transmission of information is controlled in accordance with a situation in which the utterance range is determined.

In addition, with respect to the utterance ranges 121 and 122 displayed in FIGS. 4 to 10 and once determined by the utterance range control unit 31*a*, it can be said that the utterance ranges 121 and 122 displayed in FIG. 11 is utterance ranges obtained by further narrowing down the utterance range by the transmission control unit 31*b* when there is the utterance actually.

In addition, on the basis of the text data that is the natural language process result, for example, the transmission control unit 31*b* displays the utterance content on the upper portion of the image P1 or the like in the image output unit 37 as shown by the display column M41 on the upper part of FIG. 11, on the basis of the utterance content of the user H such as "The enemy came What will I do".

Here, for example, in a case in which the utterance range 121 is displayed in the VR context information feedback display column 101 in the upper part of FIG. 11 and the utterance range 121 is determined, for example, when a volume of the input voice by the utterance is greater than a predetermined value and there is an utterance such as "Please help physical strength recovery support" by the voice data, the transmission control unit 31*b* regards that the utterance is performed to the players 91-*m* and 91-*n* of the fellows who are present in a backward direction. Therefore, the transmission control unit 31*b* displays the utterance range 121-1 including the pointers 91P-m and 91P-n corresponding to the positions of the players 91-*m* and 91-*n* in a lower part of FIG. 11.

On the basis of the text data that is the natural language process result, the transmission control unit 31*b* displays "Please help physical strength recovery support", for example, as shown in the display column M42 of FIG. 11 on the basis of the utterance contents of the user H such as "Please help physical strength recovery support". In addition, here, the volume is set to Volume=50, and for example, in a case in which the predetermined value is set to Volume=20, the volume is indicated that the volume is greater than the predetermined value.

On the other hand, for example, in a case in which the utterance range 121 is displayed in the VR context information feedback display column 101 in the upper part of FIG. 11 and the utterance range 121 is determined, for example, when the volume of the input voice by the utterance is smaller than the predetermined value and there is an utterance such as "attack with rifle" by the voice data, the transmission control unit 31*b* regards that the utterance is performed to the players 91-2 and 91-3 of the fellows who are present in a forward direction. Therefore, the transmission control unit 31*b* displays the utterance range 121-2 including the pointers 91P-2 and 91P-2 corresponding to the positions of the players 91-2 and 91-3 in the lower part of FIG. 11.

On the basis of the text data that is the natural language process result, the transmission control unit 31*b* displays "Attack with rifle", for example, as shown in the display column M43 of FIG. 11 on the basis of the utterance contents of the user H such as "Attack with rifle". In addition, here, the volume is set to Volume=10, and for example, in a case in which the predetermined value is set to Volume=20, the volume is indicated that the volume is smaller than the predetermined value.

At this time, the transmission control unit 31*b* moves and displays a text plate 191 displayed as "attack with rifle" with respect to the players 91-3 and 91-2 on the image P1 corresponding to the points 91P-2 and 91P-3 included in the utterance range 121-2 in the VR context information feedback display column 101 in the lower part of FIG. 11, as indicated by a dotted arrow.

That is, the text plate 191 displayed as "attack with rifle" reaches the player 91-2 through the player 91-3 on the image P1 as indicated by the dotted arrow. At this time, the text plate 191 is displayed on only the corresponding players 91-3 and 91-2 so that information associated with the text plate 191 is able to be read.

The text plate 191 is displayed such that the text plate 191 is sequentially circulated and transmitted to the players 91 in the order of one stroke as shown by the image P1 of the lower portion of FIG. 11. As described above, by moving the text plate 191 among the players 91 in the utterance range, it is possible to reliably recognize that the text plate 191 is transmitted to the player in the utterance range. That is, this is because that in a case where the text plate 191 is displayed such that the text plate 191 is simultaneously moved from the player 91-1 controlled by the user H to the plurality of players 91, in particular, in a case in which the number of players is enormous, there is a concern that it is impossible to recognize a player from who the text plate 191 is transmitted and it is impossible to recognize a player to whom the text plate 191 is transmitted.

With the process described above, the utterance range is determined by the utterance range control unit 31*a*, and then the utterance is performed. Therefore, the transmission control unit 31*b* determines the player to whom the information is transmitted, the information to be transmitted, and the transmission way (transmission method), and transmits the determined information to be transmitted to the determined player to whom the information is to be transmitted by the determined transmission method.

As a result, since when controlling the movement of the player in the VR, the user is able to determine the appropriate utterance range based on the VR context information by merely performing his or her own natural behavior, attitude, utterance, and movement of line of sight and it is possible to speak while recognizing the determined utterance range, it is possible to eliminate anxiety caused by not knowing to whom the spoken contents is transmitted. Therefore, it is possible to speak with ease.

In addition, after the utterance range is determined, simply by making the natural utterance, within the utterance range, the player to whom the information is transmitted, the information to be transmitted, and the transmission way (transmission method) are determined. Therefore, it is possible to transmit the information to be transmitted, which is determined according to the utterance, to the player to whom the information is to be transmitted, who is determined according to the utterance, by the transmission method determined according to the utterance.

Display Example 1 of Voice Recognition Result

Figure 12:
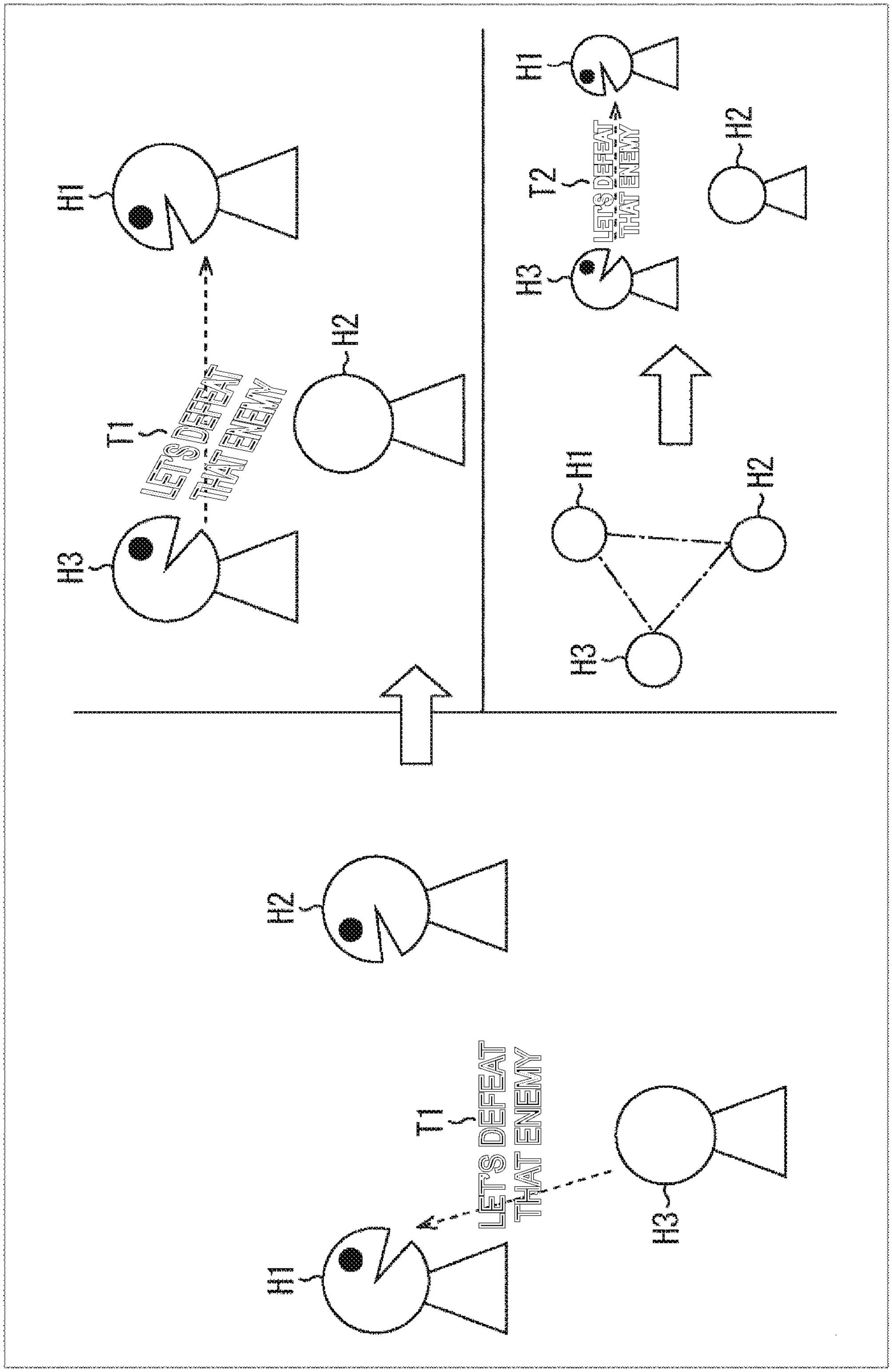
FIG. 12 is a diagram for explaining a display example 1 of a voice recognition result.

In a case in which after the spoken voice data is recognized as the voice and converted into the text data with respect to the player in the utterance range, and furthermore, the text data that is the natural recognition result obtained by the natural language process is expressed, for example, by the text plate 191 of FIG. 12, which includes, for example, a three-dimensional text, it is necessary to display the text plate 191 so as to be opposed to the transmitting partner.

For example, in a case shown in the left portion of FIG. 12, in the VR, when the player H3 speaks "Let's defeat that enemy" and the utterance recognition result is expressed as the three-dimensional text plate T1, in a case in which the players H1 and H2 are in the utterance range, the transmission control unit 31*b* displays the text plate T1 so that the text plate T1 is moved from the player H3 as a start point to the player H1 as indicated by a dotted arrow.

At this time, since the text plate T1 faces the players H1 and H3 when moving from the player H3 to the player H1, the players H1 and H3 are able to visually recognize the text plate T1 appropriately, and it is possible for the player H1 to recognize what kind of content the player H3 spoken.

On the other hand, since the text plate T1 does not face the player H2, as shown in the upper right portion of FIG. 12, the player H2 may not be able to appropriately recognize the text plate T1.

Therefore, in a case in which the players H1 and H2 are included in the utterance range of the player H3, as shown in the lower right portion of FIG. 12, the three-dimensional text plate T2 is displayed so that all the players H1 to H3 face.

In addition, in the left portion in the lower right portion of FIG. 12, the disposition of the players H1 to H3 viewed from the top is shown, and in the right portion of the lower right portion of FIG. 12, it is shown that a direction of the three-dimensional text plate T2 moving as indicated by the dotted arrow with respect to the player H1 is calculated and displayed so that all the players H1 to H3 are able to visually recognize from the player H3 as a starting point.

With the display as shown in FIG. 12, since the players H1 to H3 are able to visually recognize the text plate T11 from their respective positions, all players in the utterance range are able to appropriately recognize the contents displayed on the text plate.

Display Example 2 of Voice Recognition Result

Figure 13:
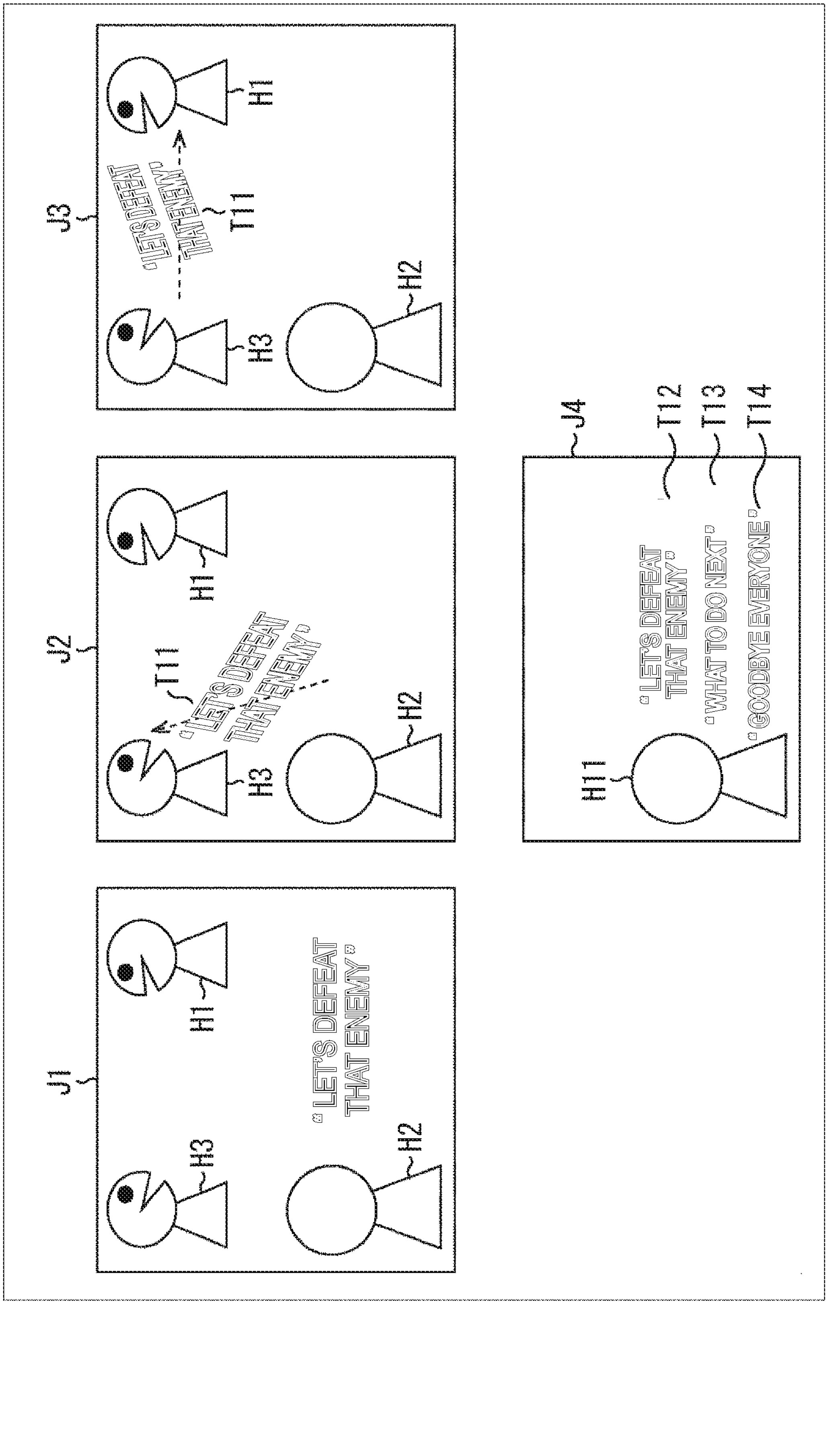
FIG. 13 is a diagram for explaining a display example 2 of the voice recognition result.

As shown by a state J1 of FIG. 13, in a case in which the players H1 to H3 are present in the VR, the player H2 speaks "Let's defeat that enemy", and the players H1 and H3 are included in the utterance range, as shown by a state J2, the transmission control unit 31*b* displays the recognition result obtained by recognizing the spoken voice as the text plate T11 so that the text plate T11 is moved from the player H2 to the player H3 while facing the player H3 as indicated by the dotted arrow. Next, as shown by a state J3, the transmission control unit 31*b* displays the text plate T11 so as to move from the player H3 to the player H1 while facing the player H1.

Since the players H1 to H3 face the text plate T11 from the respective positions by the display such as the states J1 to J3 of FIG. 13, in the VR, it is possible to recognize the transmission of "Let's defeat that enemy" spoken by the player H2 is transmitted to the players H1 and H3 which are all the players included in the utterance range.

In addition, as described above, since it is not expressed that the text plate T11 is transmitted to the plurality of players at once, by displaying one text plate T11 so as to be transmitted to the plurality of players in the utterance range in order, the user H of the player H2 is able to surely recognize the player to whom the utterance content of the user H is transmitted within the utterance range while recognizing the player in the utterance range by watching the image output unit 37.

In addition, in the above description, an example, in which text data related to the latest one utterance is transmitted as a text plate has been described, but it is also possible to transmit utterance contents of time series in a plurality of pieces. For example, as shown by a state J4 of FIG. 13, the transmission control unit 31*b* may dispose the utterance contents in time series according to timings of the text plate T12 described as "Let's defeat that enemy", the text plate T13 described as "What to do next", and the text plate T14 described as "Goodbye everyone" so that the utterance contents are transmitted in response to the utterance from the player H11. In a state J4 of FIG. 13, the utterance corresponding to the text plate T14 described as "Goodbye everyone" is made at the earliest timing, next, the utterance corresponding to the text plate T13 described as "What to do next" is made, and finally, the utterance corresponding to the text plate T12 described as "Let's defeat that enemy" is made.

Display Example 3 of Voice Recognition Result

Figure 14:
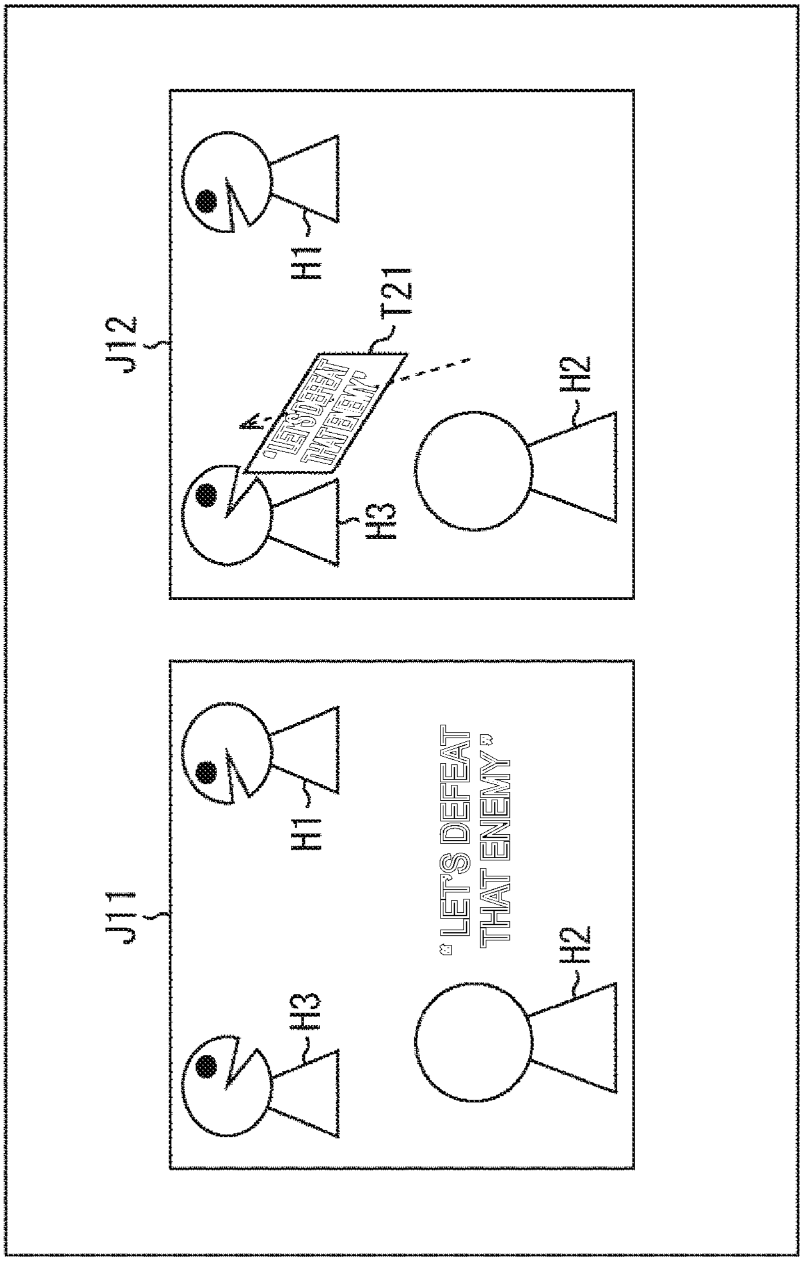
FIG. 14 is a diagram for explaining a display example 3 of the voice recognition result.

As shown by a state J11 of FIG. 14, in a case in which the players H1 to H3 are present in the VR, the player H2 speaks "Let's defeat that enemy", and only the player H3 is included in the utterance range, as shown by a state J12, the transmission control unit 31*b* displays the recognition result obtained by recognizing the spoken voice as the text plate T21 provided with blindfold with respect to the player H1 so that the text plate T21 is moved as indicated by the dotted arrow. At this time, the text plate T21 that is the recognition result moves from the player H2 to the player H1 in a state in which the text plate T21 is able to be watched by the player H3 and in a state in which the text plate T21 is not able to be watched by the player H1.

With the display as shown in FIG. 14, the player H2 is able to recognize that the text plate T21 that is the utterance content is able to be watched by the players H2 and H3 in the utterance range and is not able to be watched by the player H1 in VR. That is, with such a display, it is possible to recognize that own utterance content is transmitted to the player in the utterance range and that own utterance content is not transmitted to the player outside the utterance range.

Display Example 4 of Voice Recognition Result

Figure 15:
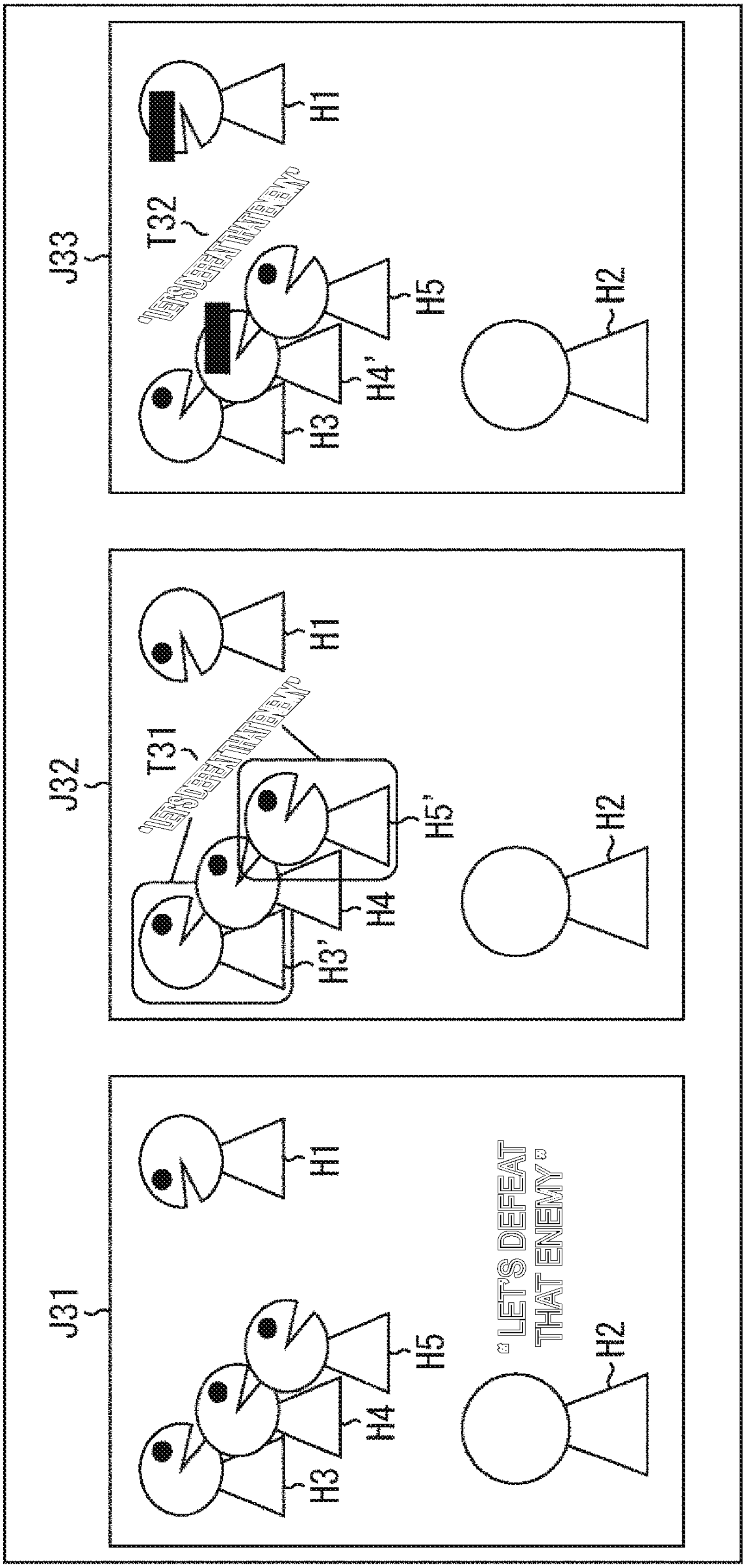
FIG. 15 is a diagram for explaining a display example 4 of the voice recognition result.

As shown by a state J31 of FIG. 15, in a case in which the players H1 to H5 are present in the VR, the player H2 speaks "Let's defeat that enemy", and only the players H3 and H5 are included in the utterance range, as shown by a state J32, the transmission control unit 31*b* displays the recognition result obtained by recognizing the spoken voice so that the players H3 and H5 that are able to watch recognition result are represented as players H3' and H5' that surround the whole and the text plate T31 that is the recognition result is connected by a lead line. With such a display, it is possible for the player H2 to recognize that the content spoken by the player H2 is able to be recognized by the players H3 and H5 and is not able to be recognized by the players H1 and H4.

With the display as shown in FIG. 15, it is possible to recognize in the VR that the text plate T31 is able to be watched by the players H3 and H5 and is not able to be watched by the player H1.

In addition, as shown by a state J33, the transmission control unit 31*b* may blind the recognition result to the players H1 and H4 that are not able to visually recognize the recognition result and expresses the players H1 and H4 as the players H1' and H4' and display the text plate T32 that is the recognition result. With such a display, it may be possible for the player H2 to recognize that the content spoken by the player H2 is able to be recognized by the players H3 and H5 and it not able to be recognized by the players H1 and H4.

<Release of Utterance Range>

The utterance range control unit 31*a* releases the utterance range after a predetermined period has elapsed since the utterance range is set.

Figure 16:
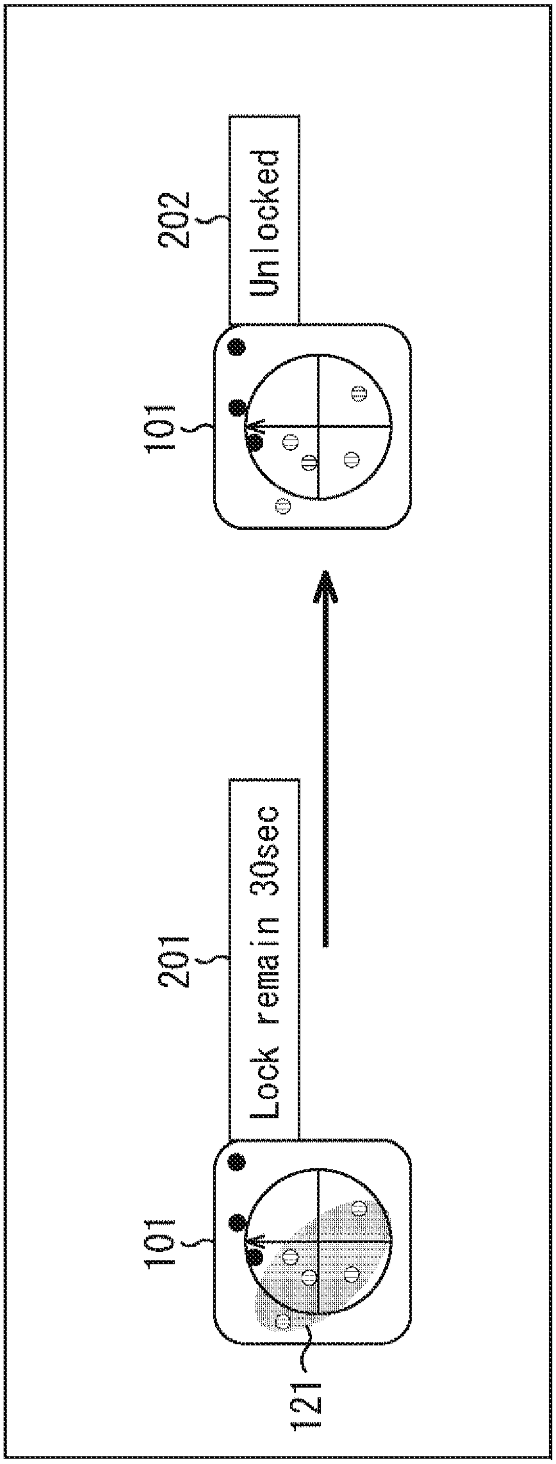
FIG. 16 is a diagram for explaining release of the utterance range.

That is, for example, as shown in FIG. 16, in a case in which the utterance range 121 (or the utterance range 122) is set in the VR context information feedback display column 101, the utterance range control unit 31*a* displays, for example, "Lock remain 30 sec", and displays a display column 201 in which the remaining time from the set timing is displayed. In addition, in a case in which a predetermined time has elapsed, the utterance range control unit 31*a* displays a display column 202 in which "unlocked" indicating release is displayed and releases the utterance range 121 (or the utterance range 122) in the VR context information feedback display column 101.

With such a display, it is possible for the user to recognize that the utterance range 121 (or the utterance range 122) is released.

In addition, in the above description, the example in which the utterance range 121 (or the utterance range 122) is released in accordance with the elapsed time since the utterance range 121 (or the utterance range 122) is set has been described. However, the utterance range 121 (or the utterance range 122) may be released by another method. For example, when the utterance "release range" is made, the utterance range control unit 31*a* may release the utterance range 121. In addition, in a case in which a specific gesture such as "shake the head" and "keep the line of sight far" is detected by the behavior information and the attitude information, the utterance range control unit 31*a* may release the utterance range 121 (or the utterance range 122).

Example 2 in which Transmission of Information is Controlled According to Situation in which Utterance Range is Determined Next, referring to FIG. 17, an example 2 in which the transmission of the information is controlled according to the situation in which the utterance range is determined by the above-described process will be described.

Figure 17:
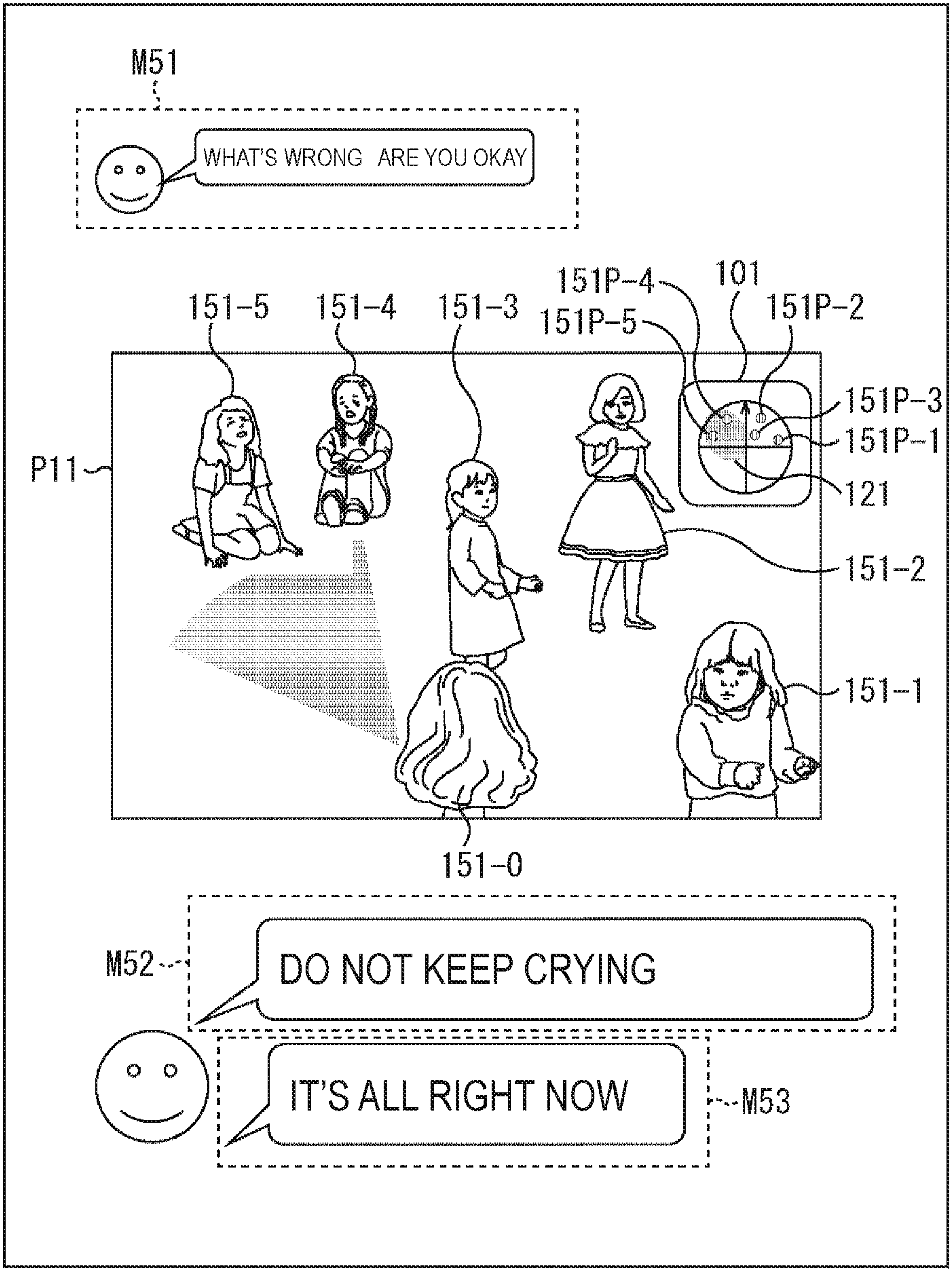
FIG. 17 is a diagram for explaining an example 2 in which the transmission of the information is controlled in accordance with the situation in which the utterance range is determined.

In a case in which the utterance range is determined by the process described above, while the user H watches the image P2 (corresponding to the image P2 of FIG. 7) of FIG. 17, the voice acquisition unit 36 collects and acquires a voice spoken as a voice, and supplies the voice to the CPU 31 as the voice data. The utterance range control unit 31*a* controlled by the CPU 31 controls the communication unit 35 to transmit the voice data to the cloud server group 12.

As a result of this process, in a case in which the voice analysis processing unit 61 acquires the voice data, after carrying out a process suitable for analysis, such as a noise removal process, the voice analysis processing unit 61 analyzes the voice data, transmits the analysis result to the information processing device 11, and transmits the voice data to the voice recognition unit 62 and the emotion estimation processing unit 65. More specifically, on the basis of the voice data, the voice analysis processing unit 61 analyzes a pitch of the voice spoken according to a rate of each fundamental frequency, a speech speed by the number of phonemes per unit time, volume, and presence or absence of intonation.

The voice recognition unit 62 recognizes the voice as a language on the basis of the voice data, converts the voice recognition result into, for example, text data, and supplies the text data to the natural language processing unit 63 and the text to speech unit 66.

The natural language processing unit 63 converts the recognition information including the text data or the like into the natural language from the contexts before and after, and supplies the text data as the conversion result to the meaning analysis processing unit 64.

The meaning analysis processing unit 64 analyzes the meaning of the utterance of the user H on the basis of the conversion result supplied from the natural language processing unit 63 and supplies the meaning analysis result that is the analysis result to the emotion estimation processing unit 65.

The emotion estimation processing unit 65 estimates the emotion of the user H on the basis of the voice data supplied from the utterance analysis processing unit 61 and the analysis result of the meaning analysis processing unit 64 and transmits the emotion estimation result and the meaning analysis result to the information processing device 11.

The text to speech unit 66 generates synthesized voice by the TTS on the basis of the natural language process result obtained by the text data, and transmits the synthesized voice to the information processing device 11.

On the basis of the emotion estimation result and the natural language process result, the transmission control unit 31*b* identifies the utterance range and displays utterance range as, for example, the utterance range 121 in the VR context information feedback display column 101 and the utterance range 122 in the image P2.

More specifically, on the basis of the natural language process result, the transmission control unit 31*b* displays the utterance content on the upper portion of the image P2 or the like in the image output unit 37, for example, as shown by a display column M51 in the upper portion of FIG. 17, on the basis of the utterance content of the user H such as "What's wrong Are you okay".

Here, for example, in a case in which when the utterance range 121 is displayed in the VR context information feedback display column 101 in the upper part of FIG. 17 and the utterance range 121 is determined, for example, when the intonation of the voice of the input voice is attached more than the emotion estimation result based on the voice data, the transmission control unit 31*b* determines that it is severe as an emotion detected based on the voice and displays the utterance content on the lower portion or the like of the image P2 in the image output unit 37, for example, as shown by a display column M52, on the basis of the utterance content of the user H, such as "Do not keep crying" made to the player 151-4 of his or her child.

On the other hand, for example, in a case in which the utterance range 121 is displayed in the VR context information feedback display column 101 in the lower part of FIG. 17 and the utterance range 121 is determined, for example, when the intonation of the voice of the input voice is not attached by the emotion estimation result based on the voice data, the transmission control unit 31*b* determines that it is easy as the emotion analyzed by the voice and displays the utterance content on the lower portion or the like of the image P2 in the image output unit 37, for example, as shown by a display column M53, on the basis of the utterance content of the user H, such as "It's all right now" made to a child 151-5 of another person.

In addition, in FIG. 17, it is assumed that the player 151-4 of the child is his or her child of the player 151-0 controlled by the user H and the player 151-5 of the child is the child of the other person of the player 151-0 controlled by the user H.

With the process described above, after the utterance range is determined by the utterance range control unit 31*a*, the utterance is made. Therefore, the transmission control unit 31*b* determines the player (for example, the player 151-4 or 151-5 of the child) to whom the information is transmitted, the information (for example, "Do not keep crying" or "It's all right now" to be transmitted, and the transmission way (for example, a transmission method: any one of display by text data such as the display column M52 or M53 or a synthesized voice generated by the natural language process result of "Do not keep crying" or "It's all right now"), and transmits the determined information to be transmitted to the determined player to whom the information is to be transmitted by the determined transmission method.

As a result, since when controlling the movement of the player in the VR, the user is able to determine the appropriate utterance range considering the VR context information by merely performing his or her own natural behavior, attitude, utterance, and movement of line of sight and it is possible to speak while recognizing the determined utterance range, it is possible to eliminate anxiety caused by not knowing to whom the spoken contents is transmitted. Therefore, it is possible to speak with ease.

In addition, after the utterance range is determined, simply by making the natural utterance, within the utterance range, the player to whom the information is transmitted, the information to be transmitted, and the transmission way (transmission method) are determined. Therefore, it is possible to transmit the information to be transmitted, which is determined according to the utterance, to the player to whom the information is to be transmitted, who is determined according to the utterance, by the transmission method determined according to the utterance.

<Control Process of Information Processing Device>

Figure 18:
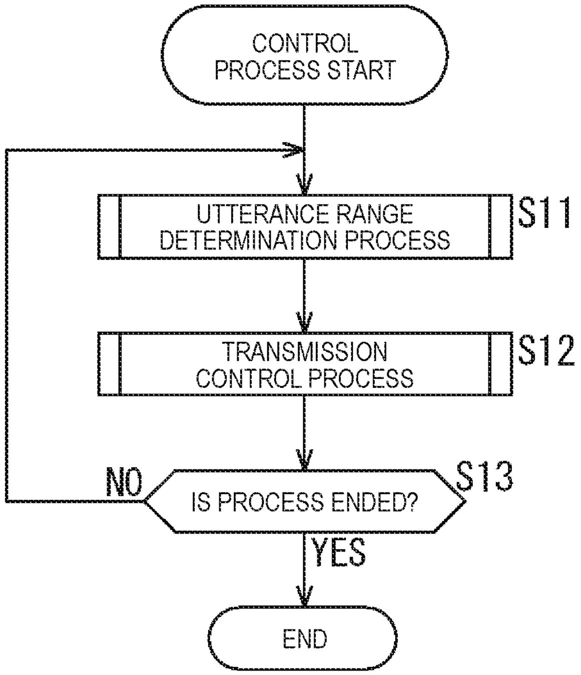
FIG. 18 is a flowchart for explaining a control process.

Next, the control process of the control unit will be described with reference to a flowchart of FIG. 18.

In step S11, the utterance range control unit 31*a* executes an utterance range determination process and determines the utterance range. In addition, the utterance range determination process will be described later in detail with reference to a flowchart of FIG. 20.

In step S12, the transmission control unit 31*b* executes a transmission control process and transmits voice or text to the determined utterance range. In addition, the transmission control process will be described later in detail with reference to a flowchart of FIG. 21.

By the processes described above, the utterance range is determined, and the voice and the text plate according to the utterance content of the user H are transmitted to the player in the utterance range with respect to the utterance range.

<Context Information Collection Process>

Figure 19:
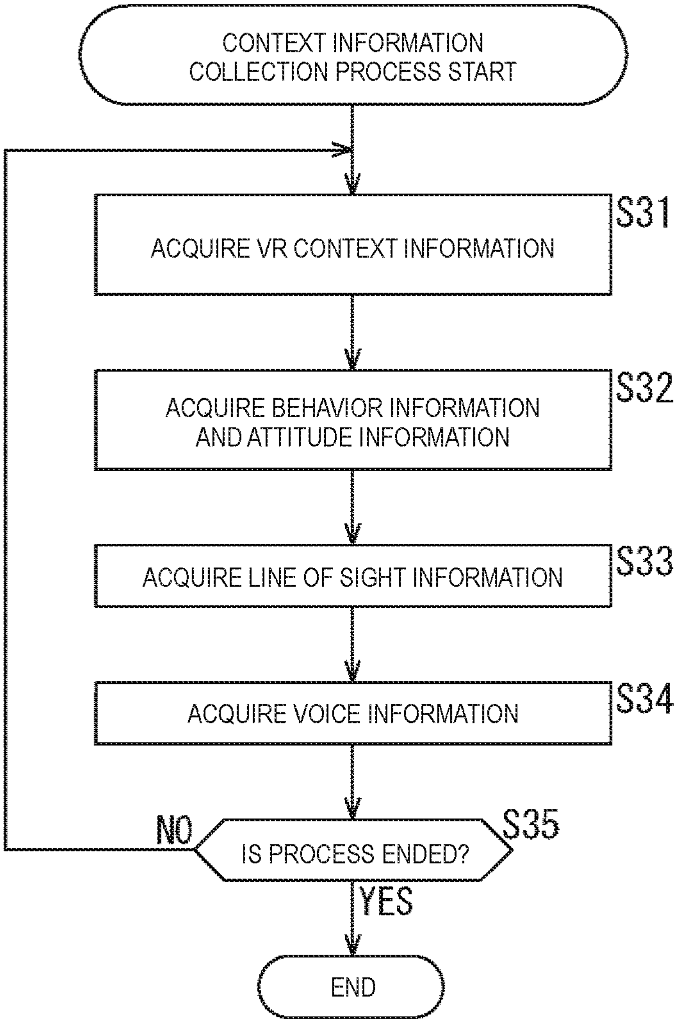
FIG. 19 is a flowchart for explaining a context information collection process.

Next, the context information collection process will be described with reference to a flowchart of FIG. 19.

In step S31, the VR context information acquisition unit 39 acquires the VR context information of the player or various objects in the VR and supplies the VR context information to the utterance range control unit 31*a*. The utterance range control unit 31*a* stores the VR context information in the storage unit 33.

In step S32, the behavior information acquisition unit 40 acquires the behavior information and the attitude information, and supplies the behavior information and the attitude information to the utterance range control unit 31*a*. The utterance range control unit 31*a* stores the behavior information and the attitude information in the storage unit 33.

In step S33, the line of sight recognition processing unit 41 recognizes the line of sight information of the user H and supplies the line of sight information to the utterance range control unit 31*a*. The utterance range control unit 31*a* stores the line of sight information in the storage unit 33.

In step S34, the voice acquisition unit 36 acquires the voice by the utterance of the user H as the voice data and supplies the voice data to the utterance range control unit 31*a*. The utterance range control unit 31*a* stores the voice data in the storage unit 33.

In step S35, the utterance range control unit 31*a* determines whether or not an end of the process is instructed, and in a case in which the end is not instructed, the process returns to step S31 and the similar process is repeated. In addition, in step S35, the end of the process is instructed, the process is ended.

By the processes described above, the VR context information, the behavior information, the attitude information, the line of sight information and the voice data (including the voice process result), which are the context information, are repeatedly acquired, sequentially updated to the latest information, and stored in the storage unit 33.

<Utterance Range Determination Process>

Figure 20:
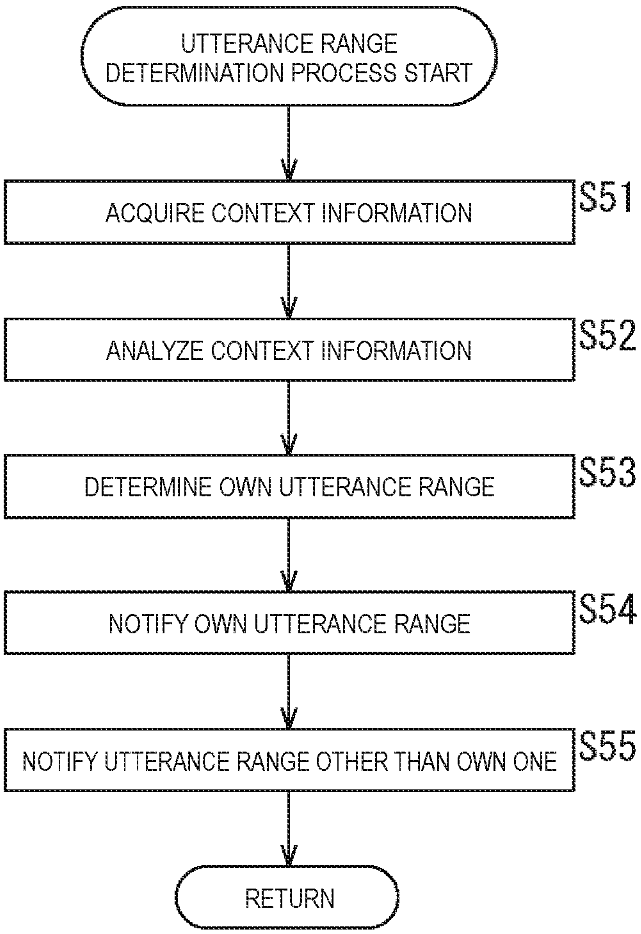
FIG. 20 is a flowchart for explaining an utterance range determination process.

Next, the utterance range determination process will be described with reference to the flowchart of FIG. 20.

In step S51, the utterance range control unit 31*a* reads the context information stored in the storage unit 33 by repeating the context information collection process described with reference to the flowchart of FIG. 19.

In step S52, the utterance range control unit 31*a* analyzes the read context information.

In step S53, the utterance range control unit 31*a* determines the utterance range on the basis of the analysis result of the context information.

In step S54, the utterance range control unit 31*a* notifies the information of the determined utterance range to the other information processing devices 11 through the communication unit 35, and presents the information of the determined utterance range by controlling at least one of the vibration unit 34, the image output unit 37, or the voice output unit 38.

In step S55, the utterance range control unit 31*a* receives notification of the information of the utterance range of the other information processing device 11 through the communication unit 35, and presents the utterance range of the other information processing device 11 by controlling at least one of the vibration unit 34, the image output unit 37, or the voice output unit 38.

By the processes described above, the user H is able to present the information of the utterance range as the player of the information processing device 11 worn by himself or herself and the information of the utterance range of the other player wearing the other information processing device 11. Therefore, it is possible to recognize the utterance range of himself or herself and the utterance range of the other player to speak. In addition, in the flowchart of FIG. 20, an example in which both of the utterance range of himself or herself and the utterance range of the other player are presented has been described, but only one of the utterance range of himself or herself and the utterance range of the other player may be presented.

More specifically, it is possible to determine the utterance range of FIGS. 4 to 10 by the processes described above.

<Transmission Control Process>

Figure 21:
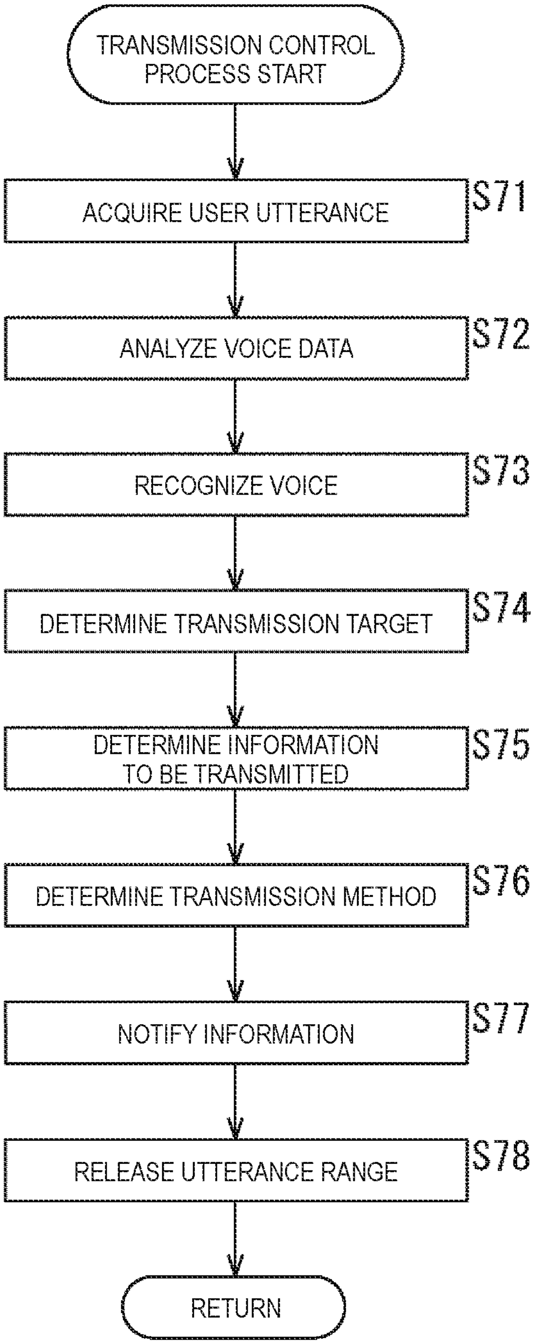
FIG. 21 is a flowchart for explaining a transmission control process.

Next, the transmission control process will be described with reference to the flowchart of FIG. 21. Here, the transmission control process is premised on that the utterance range is determined.

In step S71, the transmission control unit 31*b* controls the voice acquisition unit 36 to acquire the utterance of the user H as the voice data, and controls the communication unit 35 to transmit the acquired voice data to the cloud server group 12.

In step S72, the voice analysis processing unit 61 of the cloud server group 12 performs noise removal on the voice data to a pitch required for the voice recognition process and the meaning analysis process, and thereafter, for example, the voice analysis processing unit 61 analyzes a type of language (Japanese, French, English, and the like), a pitch of the voice spoken by a rate of each fundamental frequency, a speech speed by the number of phonemes per unit time, volume, and presence or absence of intonation, on the basis of the voice data.

In step S73, the voice recognition unit 62 recognizes the voice as a language on the basis of the voice data, converts the utterance recognition result into, for example, the text data, and supplies the text data to the natural language processing unit 63 and the text to speech unit 66. The natural language processing unit 63 performs conversion on the utterance recognition result including the text data or the like so that the utterance recognition result becomes the natural language from contexts before and after, and supplies the conversion result to the meaning analysis processing unit 64.

The meaning analysis processing unit 64 analyzes the meaning on the basis of the spoken words that are voice recognition result obtained by the natural language process and transmits the meaning analysis result to the information processing device 11. The emotion estimation processing unit 65 estimates the emotion of the spoken user on the basis of the voice data and the meaning analysis result and transmits the emotion estimation result to the information processing device 11.

In step S74, the transmission control unit 31*b* determines the player to whom the information is to be transmitted among the players in the utterance range by using at least one of the voice data, the voice analysis result, the natural language process result, the meaning analysis result, or the emotion estimation result.

In step S75, the transmission control unit 31*b* determines the information to be transmitted using at least one of the voice data, the voice analysis result, the natural language process result, the meaning analysis result, or the emotion estimation result. That is, the transmission control unit 31*b* determines, for example, information for transmitting any of the utterance content of a predetermined user, warning sound, vibration, and synthesized voice.

In step S76, the transmission control unit 31*b* determines the transmission method of the information to be transmitted by using at least one of the voice data, the voice analysis result, the natural language process result, the meaning analysis result, or the emotion estimation result. For example, the transmission control unit 31*b* determines a display method of the utterance recognition result and the like.

In step S77, the transmission control unit 31*b* notifies the determined information to the determined target by the determined transmission method.

In step S78, the transmission control unit 31*b* releases the utterance range.

By the processed described above, the player whose target is any of the players present in the utterance range determined by the utterance range determination process, the information to be transmitted, and the transmission method are determined and notified, by any of the voice data spoken by the user H, the voice analysis result, the meaning analysis result, or the emotion estimation result.

More specifically, by the processes described above, it is possible to realize the transmission control process of FIGS. 11 to 15 by the utterance after the determination of the utterance range.

In addition, by applying this, for example, it is assumed that in a case in which fellows using a plurality of languages are present in our forces in the VR, when giving instructions to a nearby fellow when moving, in the utterance range, there are two players of a player A who is able to communicate only in English and a player B who is able to communicate only in French, he or she is able to give instructions only in Japanese, furthermore, a user of the player A has a normal vision but has a hearing impairment, a user of the player B has a visual impairment but has a normal hearing.

In this case, when he or she gives an instruction C to the two people by the utterance of Japanese, the instruction C is able to be converted into English and is able to be transmitted to the player A so that the text data is displayed by an image, and the instruction C is able to be converted into French and is able to be transmitted by the synthesized voice to the player B. That is, according to the utterance content, the target of the utterance is determined as any of the player A or the player B, the information to be transmitted is determined to be any of the instruction C of English or the instruction C of French, and the transmission method is determined as any of transmitting the text data by displaying the text data by the image or transmitting the utterance content by the synthesized voice. At this time, it is possible to control the communication partner without losing a sense of immersion in the VR and without impairing a VR world view on a state in which any of the user who controls the player does not need to be aware of his or her own disorder, use language, or the like.

In addition, by applying the example in which the state in which the eye contact described with reference to FIGS. 9 and 10 is exchanged is displayed as the utterance range, for example, the eye contact is able to be transmitted to the partner intended to be a business partner at dinner or parties in the VR, and a business conversation is able to be realized the parties who have established the eye contact at a timing at which a mutual eye contact is established. In this case, since the utterance range is the parties who have established the eye contact, highly confidential conversation is also possible.

Furthermore, in the above description, the utterance range and the transmission control in the VR have been described. However, in a case in which it is impossible to communicate with each other without using a communication device, for example, in a case of underwater or outer space, it is possible to apply the utterance range and the transmission control also in a real space.

In any case, it is possible to speak while confirming the utterance range after the utterance range to be the target is determined on the basis of the context information by the utterance range determination process, the utterance range is notified to the user, and this is notified to the user. Furthermore, by the transmission control process based on the utterance, the player to be the target of the utterance is determined with more high degree, the information to be transmitted and the transmission method are determined, and the information is notified.

As a result, in communication between the players in the VR since the transmission destination or the transmission source is clear, it is possible to realize the communication between the players in a comfortable VR. In addition, it is possible to distinguish between a direct message and a public message. Furthermore, since it is possible to perform communication by uttering in a state in which the transmission destination is clear, it is possible to control the communication partner without losing a sense of immersion in the VR and without impairing the VR world view.

<Example for Executing by Software>

Incidentally, the series of the processes described above is able to be executed by hardware, but the series of the processes described above is also able to be executed by software. In a case in which the series of the processes is executed by software, a program included in the software is installed from a recording medium to a computer built into dedicated hardware, or for example, a general-purpose personal computer capable of executing various functions by installing various programs, or the like.

Figure 22:
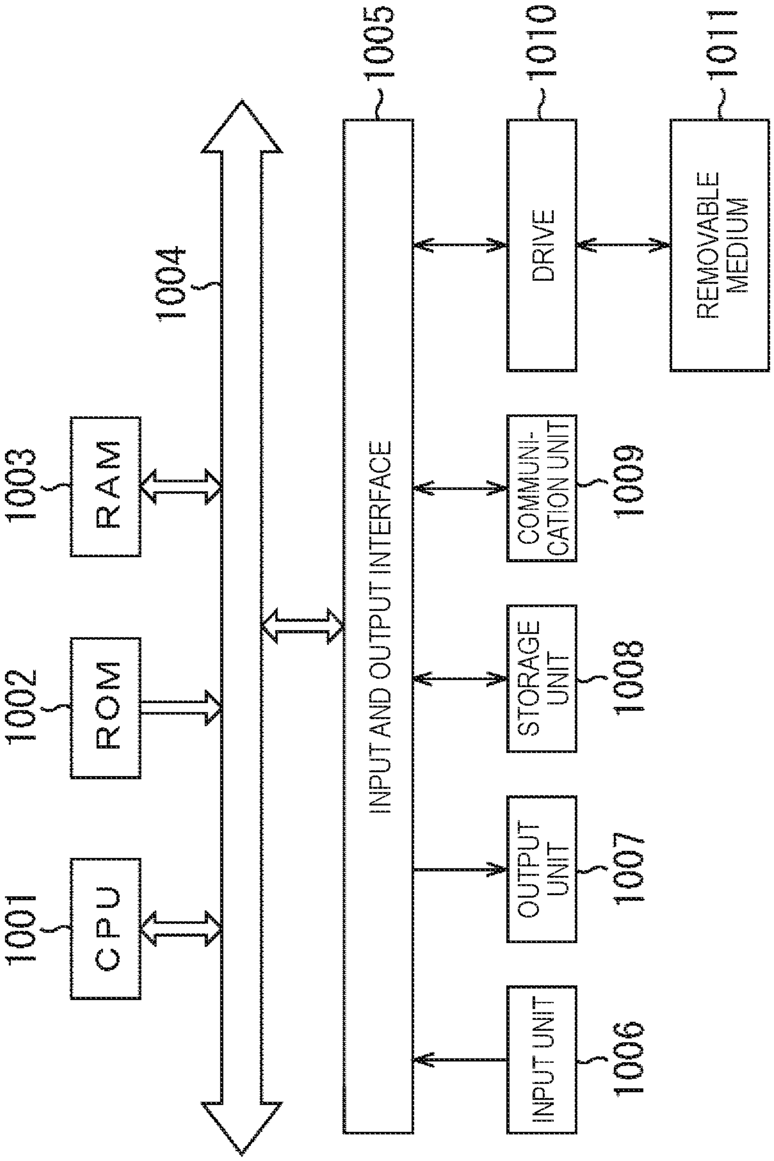
FIG. 22 is a diagram for explaining a configuration example of a general-purpose personal computer.

FIG. 22 shows a configuration example of a general-purpose personal computer. This personal computer has a central processing unit (CPU) 1001 built therein. An input and output interface 1005 is connected to the CPU 1001 through a bus 1004. A read only memory (ROM) 1002 and a random access memory (RAM) 1003 are connected to the bus 1004.

An input unit 1006 including an input device such as a keyboard and a mouse through which the user inputs an operation command, an output unit 1007 that outputs a process operation screen or an image of a process result to a display device, a storage unit 1008 that includes a hard disk drive or the like storing a program or various data, and a communication unit 1009 that includes a local area network (LAN) adapter or the like and executes a communication process through a network represented by the Internet are connected to the input and output interface 1005. In addition, a magnetic disk (including a flexible disk), an optical disk (including a compact disc-read only memory (CD-ROM) and a digital versatile disc (DVD)), a magneto-optical disk (including a mini disc (MD), a drive 1010 that reads and writes data from and to a removable medium 1011 such as a semiconductor memory is connected to the input and output interface 1005.

The CPU 1001 executes various processes according to the program stored in the ROM 1002 or the program that is read from the magnetic disk, the optical disk, the magneto-optical disk, or the removable medium 1011 such as a semiconductor memory, installed in the storage unit 1008, and loaded to the RAM 1003 from the storage unit 1008. The RAM 1003 also appropriately stores data necessary for the CPU 1001 to execute various processes.

In the computer configured as described above, the CPU 1001 loads a program that is stored, for example, in the storage unit 1008 onto the RAM 1003 via the input/output interface 1005 and the bus 1004, and executes the program, thereby performing the above-described series of processes.

For example, programs to be executed by the computer (CPU 1001) can be recorded and provided in the removable medium 1011, which is a packaged medium or the like. In addition, programs can be provided via a wired or wireless transmission medium such as a local area network, the Internet, and digital satellite broadcasting.

In the computer, by mounting the removable medium 1011 onto the drive 1010, programs can be installed into the storage unit 1008 via the input/output interface 1005. Programs can also be received by the communication unit 1009 via a wired or wireless transmission medium, and installed into the storage unit 1008. In addition, programs can be installed in advance into the ROM 1002 or the storage unit 1008.

Note that a program executed by the computer may be a program in which processes are chronologically carried out in a time series in the order described herein or may be a program in which processes are carried out in parallel or at necessary timing, such as when the processes are called.

Note that the CPU 1001 in FIG. 22 corresponds to the CPU 31.

Further, in this specification, a system has the meaning of a set of a plurality of structural elements (such as an apparatus or a module (part)), and does not take into account whether or not all the structural elements are in the same casing. Therefore, the system may be either a plurality of apparatuses stored in separate casings and connected through a network, or an apparatus in which a plurality of modules is stored within a single casing.

An embodiment of the present disclosure is not limited to the embodiments described above, and various changes and modifications may be made without departing from the scope of the present disclosure.

For example, the present disclosure can adopt a configuration of cloud computing, in which a plurality of devices shares a single function via a network and perform processes in collaboration.

Furthermore, each step in the above-described flowcharts can be executed by a single device or shared and executed by a plurality of devices.

In addition, when a single step includes a plurality of processes, the plurality of processes included in the single step can be executed by a single device or shared and executed by a plurality of devices.

Additionally, the present technology may also be configured as below.

<1>

An information processing device including:

an utterance range determination unit that determines a range in which another player capable of recognizing spoken content is present as an utterance range when a player speaks on the basis of context information.

<2>

The information processing device according to <1>, in which the utterance range is a range in which another player capable of recognizing information based on voice data spoken by the player is present.

<3>

The information processing device according to <1> or <2>, in which the context information includes voice data, behavior information, attitude information, line of sight information, and peripheral context information of the player.

<4>

The information processing device according to <3>, further including:

a voice data acquisition unit that acquires an utterance of the player as the voice data from the context information, in which the utterance range determination unit determines the utterance range on the basis of the voice data.

<5>

The information processing device according to <4>, in which the utterance range determination unit determines the utterance range on the basis of a pitch of the voice data.

<6>

The information processing device according to <4>, in which the utterance range determination unit determines the utterance range on the basis of a speech speed of the voice data.

<7>

The information processing device according to <3>, further including:

a behavior information attitude information acquisition unit that acquires the behavior information and the attitude information of the context information, in which the utterance range determination unit determines the utterance range on the basis of the behavior information and the attitude information.

<8>

The information processing device according to <3>, further including:

a line of sight information acquisition unit that acquires the line of sight information of the context information, in which the utterance range determination unit determines the utterance range on the basis of the line of sight information.

<9>

The information processing device according to <3>, further including:

a peripheral context information acquisition unit that acquires the peripheral context information of the context information, in which the utterance range determination unit determines the utterance range on the basis of the peripheral context information.

<10>

The information processing device according to <9>, in which the peripheral context information includes virtual reality (VR) context information.

<11>

The information processing device according to <10>, further including:

a line of sight information acquisition unit that acquires the line of sight information of the context information; and a display unit that displays a VR space on the basis of the VR context information, in which, when a line of sight of the player stagnates at a position where a predetermined player is present in the VR space for a predetermined time on the basis of the line of sight information, the display unit displays a line of sight stagnation mark representing a time when the line of sight stagnates on a position where the predetermined player is displayed.

<12>

The information processing device according to <11>, in which, when the line of sight of the player stagnates at a position where another player is present in the VR space, which is displayed by the display unit, for a time longer than a predetermined time on the basis of the line of sight information, the utterance range determination unit determines the other player as the utterance range, and the display unit displays a mark indicating the determination of the utterance range by the line of sight on a position where the other player is displayed.

<13>

The information processing device according to <12>, in which, when the utterance range determination unit determines the player within the utterance range by a line of sight of the other player on the basis of the line of sight information of the other player in the VR space, the display unit displays a reception line of sight stagnation mark on a position where the other player is displayed.

<14>

The information processing device according to <13>, in which, in a case in which it is able to be confirmed that the reception line of sight stagnation mark is visually recognized on the basis of the line of sight information of the player in the VR space, the utterance range determination unit determines the other player as the utterance range, and the display unit displays a mark representing that eye contact is established on a position where the other player is displayed.

<15>

The information processing device according to <10>, further including:

a display unit that displays a VR space on the basis of the VR context information;

a voice data acquisition unit that acquires an utterance of the player as the voice data from the context information; and a transmission control unit that controls to which player included in the utterance range transmission is to be performed on the basis of the voice data acquired by the voice data acquisition unit, in which the transmission control unit displays a voice recognition result of the voice data as text on the display unit, and in a case in which a plurality of the players is present in the utterance range, the transmission control unit sequentially moves and displays the text to each of the plurality of players in order.

<16>

The information processing device according to <15>, in which the transmission control unit displays, on the display unit, text that is able to be visually recognized by a player within the utterance range and that is not able to be visually recognized by a player outside the utterance range.

<17>

The information processing device according to any one of <1> to <16>, in which the utterance range is presented to the player by any one of an image, a warning sound, a warning vibration, and a warning synthetic sound, or a combination of the image, the warning sound, the warning vibration, and the warning synthetic sound.

<18>

An information processing method including:

a step of determining a range in which another player capable of recognizing spoken content is present as an utterance range when a player speaks on the basis of context information.

<19>

A program that causes a computer to function as:

an utterance range determination unit that determines a range in which another player capable of recognizing spoken content is present as an utterance range when a player speaks on the basis of context information.

REFERENCE SIGNS LIST

11, 11-1 to **11-*n*** information processing device
12 cloud server group
31 CPU
**31*a*** utterance range control unit
**31*b*** transmission control unit
32 memory
33 storage unit
34 vibration unit
35 communication unit
36 voice acquisition unit
37 image output unit
38 voice output unit
39 VR context information acquisition unit
40 behavior information acquisition unit
41 line of sight recognition processing unit
61 voice analysis processing unit
62 voice recognition unit
63 natural language processing unit
64 meaning analysis processing unit
65 emotion estimation processing unit
66 text to speech unit

The invention claimed is:

1. An information processing device comprising:

an utterance range determination unit configured to determine, on a basis of context information, a range in which an other player capable of recognizing spoken content is present as an utterance range when a player speaks, wherein the context information includes a predetermined amount of time that a line of sight of the player remains on a position of the other player in a virtual reality (VR) space, and wherein the utterance range determination unit is implemented via at least one processor.

2. The information processing device according to claim 1, wherein the utterance range is a range in which the other player capable of recognizing information based on voice data spoken by the player is present.

3. The information processing device according to claim 1, wherein the context information further includes at least one of voice data, behavior information, attitude information, line of sight information, or peripheral context information of the player.

4. The information processing device according to claim 3, further comprising:

a voice data acquisition unit configured to acquire an utterance of the player as the voice data from the context information, wherein the utterance range determination unit determines the utterance range on the basis of the voice data, and wherein the voice data acquisition unit is implemented via at least one processor.

5. The information processing device according to claim 4, wherein the utterance range determination unit determines the utterance range on a basis of a pitch of the voice data.

6. The information processing device according to claim 4, wherein the utterance range determination unit determines the utterance range on a basis of a speech speed of the voice data.

7. The information processing device according to claim 3, further comprising:

a behavior information attitude information acquisition unit configured to acquire the behavior information and the attitude information of the context information, wherein the utterance range determination unit determines the utterance range on the basis of the behavior information and the attitude information, and wherein the behavior information attitude acquisition unit is implemented via at least one processor.

8. The information processing device according to claim 3, further comprising:

a line of sight information acquisition unit configured to acquire the line of sight information of the context information, wherein the utterance range determination unit determines the utterance range on the basis of the line of sight information, and wherein the line of sight information acquisition unit is implemented via at least one processor.

9. The information processing device according to claim 3, further comprising:

a peripheral context information acquisition unit configured to acquire the peripheral context information of the context information, wherein the utterance range determination unit determines the utterance range on the basis of the peripheral context information, and wherein the line of sight information acquisition unit is implemented via at least one processor.

10. The information processing device according to claim 9, wherein the peripheral context information includes virtual reality (VR) context information.

11. The information processing device according to claim 10, further comprising:

a line of sight information acquisition unit configured to acquire the line of sight information of the context information; and a display configured to display the VR space on the basis of the VR context information, wherein, when the line of sight of the player remains at the position where the other player is present in the VR space for the predetermined amount of time on the basis of the line of sight information, the display displays a mark representing the amount of time that the line of sight remains on the position where the predetermined player is displayed, and wherein the line of sight information acquisition unit is implemented via at least one processor.

12. The information processing device according to claim 11, wherein, when the line of sight of the player remains at the position where the other player is present in the VR space, which is displayed by the display, for a time longer than the predetermined time on the basis of the line of sight information, the utterance range determination unit determines the other player as the utterance range, and the display displays a mark indicating the determination of the utterance range by the line of sight on the position where the other player is displayed.

13. The information processing device according to claim 12, wherein, when the utterance range determination unit determines the player within the utterance range by a line of sight of the other player on the basis of the line of sight information of the other player in the VR space, the display displays a mark indicating a reception line of sight on the position where the other player is displayed.

14. The information processing device according to claim 13, wherein, when the mark indicating the reception line of sight is visually recognized on the basis of the line of sight information of the player in the VR space, the utterance range determination unit determines the other player as being within the utterance range, and the display displays a mark representing that eye contact is established on the position where the other player is displayed.

15. The information processing device according to claim 10, further comprising:

a display configured to display the VR space on the basis of the VR context information;

a voice data acquisition unit configured to acquire an utterance of the player as the voice data from the context information; and a transmission control unit configured to control to which player included in the utterance range transmission is to be performed on the basis of the voice data acquired by the voice data acquisition unit, wherein the transmission control unit displays a voice recognition result of the voice data as text on the display, and in a case in which a plurality of the players is present in the utterance range, the transmission control unit sequentially moves and displays the text to each of the plurality of players in order, and wherein the voice data acquisition unit and the transmission control unit are each implemented via at least one processor.

16. The information processing device according to claim 15, wherein the transmission control unit displays, on the display, text that is able to be visually recognized by a player within the utterance range and that is not able to be visually recognized by a player outside the utterance range.

17. The information processing device according to claim 1, wherein the utterance range is presented to the player by any one of an image, a warning sound, a warning vibration, and a warning synthetic sound, or a combination of the image, the warning sound, the warning vibration, or the warning synthetic sound.

18. The information processing device according to claim 1, wherein the predetermined amount of time is indicated with respect to the other player.

19. An information processing method comprising:

determining, on a basis of context information, a range in which an other player capable of recognizing spoken content is present as an utterance range when a player speaks, wherein the context information includes a predetermined amount of time that a line of sight of the player remains on a position of the other player in a virtual reality (VR) space.

20. A non-transitory computer-readable storage medium having embodied thereon a program, which when executed by a computer causes the computer to execute a method, the method comprising:

determining, on a basis of context information, a range in which an other player capable of recognizing spoken content is present as an utterance range when a player speaks, wherein the context information includes a predetermined amount of time that a line of sight of the player remains on a position of the other player in a virtual reality (VR) space.

* * * * *